United States Patent
Lnu et al.

(10) Patent No.: US 12,301,356 B2
(45) Date of Patent: May 13, 2025

(54) RETRANSMISSION OPTIMIZATION MECHANISMS

(71) Applicant: QUALCOMM Incorporated, San Diego, CA (US)

(72) Inventors: Sagar Lnu, Hyderabad (IN); Sujeet Mandloi, Indore (IN); Manas Ranjan Patro, Berhampur (IN)

(73) Assignee: QUALCOMM Incorporated, San Diego, CA (US)

( * ) Notice: Subject to any disclaimer, the term of this patent is extended or adjusted under 35 U.S.C. 154(b) by 576 days.

(21) Appl. No.: 17/836,356

(22) Filed: Jun. 9, 2022

(65) Prior Publication Data

US 2023/0403102 A1   Dec. 14, 2023

(51) Int. Cl.
*H04L 1/08*      (2006.01)
*H04L 1/1607*    (2023.01)
*H04L 1/20*      (2006.01)
*H04W 24/08*     (2009.01)

(52) U.S. Cl.
CPC .............. *H04L 1/08* (2013.01); *H04L 1/1642* (2013.01); *H04L 1/203* (2013.01); *H04W 24/08* (2013.01)

(58) Field of Classification Search
CPC . H04L 1/20; H04L 1/1607; H04L 1/08; H04L 1/1812; H04W 24/08
See application file for complete search history.

(56) References Cited

U.S. PATENT DOCUMENTS 10,958,383 B2 *  3/2021  Li ................... H04W 72/1268
12,156,231 B2 * 11/2024  Takahashi ............ H04L 5/0094

2018/0324837 A1 * 11/2018  Tooher ............. H04W 72/0446
2019/0140783 A1 *  5/2019  Yerramalli ........... H04L 1/1816
2019/0173619 A1 *  6/2019  Li .................... H04W 76/27
2020/0067628 A1 *  2/2020  Xu ................... H04L 1/0004
2020/0229171 A1 *  7/2020  Khoryaev .............. H04W 4/40
(Continued)

FOREIGN PATENT DOCUMENTS

EP    3890426 A1    10/2021

OTHER PUBLICATIONS

International Search Report and Written Opinion—PCT/US2023/065621—ISA/EPO—Jul. 11, 2023.
(Continued)

*Primary Examiner* — Hassan A Phillips
*Assistant Examiner* — Prenell P Jones
(74) *Attorney, Agent, or Firm* — Holland & Hart LLP

(57) ABSTRACT

Methods, systems, and devices for wireless communications are described. Some wireless communications systems may support retransmission optimization mechanisms. For example, a first network node may receive one or more signals, each of the one or more signals received as an initial retransmission and as one or more retransmissions according to a first redundancy version (RV) index order. The first RV index order may specify respective RV indices for each of the initial transmission and the one or more retransmissions. The first network node may monitor the initial transmission and the one or more retransmissions to determine an error metric associated with each RV index of the first RV index order and may transmit a request to transmit future signals according to a second RV index order based on the monitoring.

30 Claims, 14 Drawing Sheets

(56) References Cited

U.S. PATENT DOCUMENTS

2020/0374933 A1* 11/2020 Lou .................. H04W 74/0816
2023/0141159 A1* 5/2023 Sundararajan .......... H04L 1/189
370/329

OTHER PUBLICATIONS

ZTE, Sanechips: "Remaining Issues for Data Resource Allocation", 3GPP TSG RAN WG1 Meeting #92, R1-1801629, 3rd Generation Partnership Project (3GPP), Mobile Competence Centre, 650, Route Des Lucioles, F-06921 Sophia-Antipolis Cedex, France, vol. RAN WG1, No, Athens, Greece, Feb. 26-Mar. 2, 2018, XP051396972, pp. 1-11, Section 2.2.

* cited by examiner

RETRANSMISSION OPTIMIZATION MECHANISMS

FIELD OF TECHNOLOGY

The following relates to wireless communications, including retransmission optimization mechanisms.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support retransmission optimization mechanisms. Generally, the techniques described herein provide for a first network node, such as a user equipment (UE), to monitor signals, such as downlink signals, transmitted according to a first redundancy version (RV) index order and transmit a request to a second network node, such as a network entity, to transmit future signals according to a second RV index order based on the monitoring. In other examples, the first network node may be a network entity (such as a base station), while the second network node may be a UE. For example, the first network node may receive, from the second network node, one or more signals, where each of the signals are received as an initial transmission and as one or more retransmissions according to a first RV index order. The first RV index order may specify respective RV indices for each of the initial transmission and the one or more retransmissions and, in some cases, may include self-decodable and non-self-decodable RV indices. The first network node may monitor the initial transmission and the one or more retransmissions for each signal to determine an error metric associated with each RV index order from the first RV index order. For example, the first network node may determine a first block error rate (BLER) associated with a first RV index of the first RV index order and a second BLER associated with a second RV index of the first RV index order. In some cases, the first network node may compare the error metrics associated with each RV index order. For example, the first network node may compare the first BLER associated with the first RV index order to the second BLER associated with the second RV index order. Additionally, the first network node may transmit a request for the second network node to transmit future signals according to a second RV index order based on the comparison. For example, the first network node may determine the first BLER associated with the first RV index is greater than the second BLER associated with the second RV index and may transmit the request based on the first BLER being greater than the second BLER. In some cases, the second RV index order may include self-decodable RV indices.

A method is described. The method may include receiving, from a second network node, one or more signals, each of the one or more signals received as an initial transmission and as one or more retransmissions in accordance with a first RV index order which specifies respective RV indices for each of the initial transmission and the one or more retransmissions, monitoring the initial transmission and the one or more retransmissions for each of the one or more signals to determine an error metric associated with each RV index of the first RV index order, and transmitting a request for the second network node to transmit future signals in accordance with a second RV index order based on the monitoring.

An apparatus is described. The apparatus may include a processor, memory coupled with the processor, and instructions stored in the memory. The instructions may be executable by the processor to cause the apparatus to receive, from a second network node, one or more signals, each of the one or more signals received as an initial transmission and as one or more retransmissions in accordance with a first RV index order which specifies respective RV indices for each of the initial transmission and the one or more retransmissions, monitor the initial transmission and the one or more retransmissions for each of the one or more signals to determine an error metric associated with each RV index of the first RV index order, and transmit a request for the second network node to transmit future signals in accordance with a second RV index order based on the monitoring.

Another apparatus is described. The apparatus may include means for receiving, from a second network node, one or more signals, each of the one or more signals received as an initial transmission and as one or more retransmissions in accordance with a first RV index order which specifies respective RV indices for each of the initial transmission and the one or more retransmissions, means for monitoring the initial transmission and the one or more retransmissions for each of the one or more signals to determine an error metric associated with each RV index of the first RV index order, and means for transmitting a request for the second network node to transmit future signals in accordance with a second RV index order based on the monitoring.

A non-transitory computer-readable medium storing code is described. The code may include instructions executable by a processor to receive, from a second network node, one or more signals, each of the one or more signals received as an initial transmission and as one or more retransmissions in accordance with a first RV index order which specifies respective RV indices for each of the initial transmission and the one or more retransmissions, monitor the initial transmission and the one or more retransmissions for each of the one or more signals to determine an error metric associated with each RV index of the first RV index order, and transmit a request for the second network node to transmit future signals in accordance with a second RV index order based on the monitoring.

In some examples of the method, apparatuses, and non-transitory computer-readable medium described herein, monitoring the initial transmission and the one or more retransmissions for each of the one or more signals may include operations, features, means, or instructions for monitoring the initial transmission and the one or more retransmissions for each of the one or more signals to determine a first error metric associated with a first RV index of the first RV index order and a second error metric associated with a second RV index of the first RV index order and comparing the first error metric associated with the first RV index to the second error metric associated with the second RV index, where transmitting the request may be based on the comparison.

Some examples of the method, apparatuses, and non-transitory computer-readable medium described herein may further include operations, features, means, or instructions for determining that the first error metric associated with the first RV index may be less than the second error metric associated with the second RV index, where transmitting the request may be based on the determining.

In some examples of the method, apparatuses, and non-transitory computer-readable medium described herein, monitoring the initial transmission and the one or more retransmissions for each of the one or more signals may include operations, features, means, or instructions for monitoring the initial transmission and the one or more retransmissions for each of the one or more signals to determine the error metric associated with each RV index of the first RV index order during a duration associated with a timer, where transmitting the request may be based on expiration of the timer.

In some examples of the method, apparatuses, and non-transitory computer-readable medium described herein, receiving the one or more signals may include operations, features, means, or instructions for receiving the one or more signals, each of the one or more signals received as the initial transmission and as the one or more retransmissions in accordance with the first RV index order, where the first RV index order includes self-decodable RVs, non-self-decodable RVs, or both.

In some examples of the method, apparatuses, and non-transitory computer-readable medium described herein, the first RV index order includes a RV index order of zero, two, three, and then one.

In some examples of the method, apparatuses, and non-transitory computer-readable medium described herein, transmitting the request may include operations, features, means, or instructions for transmitting the request for the second network node to transmit the future signals in accordance with the second RV index order, where the second RV index order includes self-decodable RVs.

In some examples of the method, apparatuses, and non-transitory computer-readable medium described herein, monitoring the initial transmission and the one or more retransmissions for each of the one or more signals may include operations, features, means, or instructions for measuring a BLER of the initial transmission and the one or more retransmissions, where the error metric associated with each RV index of the first RV index order may be based on the measuring.

Some examples of the method, apparatuses, and non-transitory computer-readable medium described herein may further include operations, features, means, or instructions for receiving the future signals in accordance with the second RV index order.

In some examples of the method, apparatuses, and non-transitory computer-readable medium described herein, the second RV index order includes a RV index order of zero, three, zero, and then three.

In some examples of the method, apparatuses, and non-transitory computer-readable medium described herein, transmitting the request may include operations, features, means, or instructions for transmitting the request for the second network node to transmit the future signals in accordance with the second RV index order via uplink control information or a medium access control-control element.

In some examples of the method, apparatuses, and non-transitory computer-readable medium described herein, the first network node communicates via a non-terrestrial network or using ultra low-reliability low-latency communications.

In some examples of the method, apparatuses, and non-transitory computer-readable medium described herein, the first RV index order may be based on one or more parameters at the first network node.

Some examples of the method, apparatuses, and non-transitory computer-readable medium described herein may further include operations, features, means, or instructions for receiving a second control message indicating the first RV index order.

Some examples of the method, apparatuses, and non-transitory computer-readable medium described herein may further include operations, features, means, or instructions for failing to decode the initial transmission and transmitting a feedback message including an indication that the first network node failed to decode the initial transmission, where receiving the one or more retransmissions may be based on the feedback message.

A method for wireless communications at a second network node is described. The method may include transmitting one or more signals, each of the one or more signals transmitted as an initial transmission and as one or more retransmissions in accordance with a first RV index order which specifies respective RV indices for each of the initial transmission and the one or more retransmissions, receiving a request that the second network node transmit future signals in accordance with a second RV index order, and transmitting the future signals in accordance with the second RV index order.

An apparatus for wireless communications at a second network node is described. The apparatus may include a processor, memory coupled with the processor, and instructions stored in the memory. The instructions may be executable by the processor to cause the apparatus to transmit one or more signals, each of the one or more signals transmitted as an initial transmission and as one or more retransmissions in accordance with a first RV index order which specifies respective RV indices for each of the initial transmission and the one or more retransmissions, receive a request that the second network node transmit future signals in accordance with a second RV index order, and transmit the future signals in accordance with the second RV index order.

Another apparatus for wireless communications at a second network node is described. The apparatus may include means for transmitting one or more signals, each of the one or more signals transmitted as an initial transmission and as one or more retransmissions in accordance with a first RV index order which specifies respective RV indices for each of the initial transmission and the one or more retransmissions, means for receiving a request that the second network node transmit future signals in accordance with a second RV index order, and means for transmitting the future signals in accordance with the second RV index order.

A non-transitory computer-readable medium storing code for wireless communications at a second network node is described. The code may include instructions executable by a processor to transmit one or more signals, each of the one or more signals transmitted as an initial transmission and as one or more retransmissions in accordance with a first RV index order which specifies respective RV indices for each of the initial transmission and the one or more retransmissions, receive a request that the second network node transmit future signals in accordance with a second RV index order, and transmit the future signals in accordance with the second RV index order.

In some examples of the method, apparatuses, and non-transitory computer-readable medium described herein, transmitting the one or more signals may include operations, features, means, or instructions for transmitting the one or more signals, each of the one or more signals transmitted as the initial transmission and as the one or more retransmissions in accordance with the first RV index order, where the first RV index order includes self-decodable RVs, non-self-decodable RVs, or both.

In some examples of the method, apparatuses, and non-transitory computer-readable medium described herein, the first RV index order includes a RV index order of zero, two, three, and then one.

In some examples of the method, apparatuses, and non-transitory computer-readable medium described herein, receiving the request may include operations, features, means, or instructions for receiving the request for the second network node to transmit the future signals in accordance with the second RV index order, where the second RV index order includes self-decodable RVs.

In some examples of the method, apparatuses, and non-transitory computer-readable medium described herein, the second RV index order includes a RV index order of zero, three, zero, and then three.

In some examples of the method, apparatuses, and non-transitory computer-readable medium described herein, receiving the request may include operations, features, means, or instructions for receiving the request for the second network node to transmit the future signals in accordance with the second RV index order via uplink control information or a medium access control-control element.

In some examples of the method, apparatuses, and non-transitory computer-readable medium described herein, the second network node communicates via a non-terrestrial network or using ultra low-reliability low-latency communications.

In some examples of the method, apparatuses, and non-transitory computer-readable medium described herein, the first RV index order may be based on one or more parameters at a first network node.

Some examples of the method, apparatuses, and non-transitory computer-readable medium described herein may further include operations, features, means, or instructions for transmitting a second control message indicating the first RV index order.

Some examples of the method, apparatuses, and non-transitory computer-readable medium described herein may further include operations, features, means, or instructions for receiving a feedback message including an indication that a first network node failed to decode the initial transmission, where transmitting the one or more retransmissions may be based on the feedback message.

DETAILED DESCRIPTION

Figure 1:
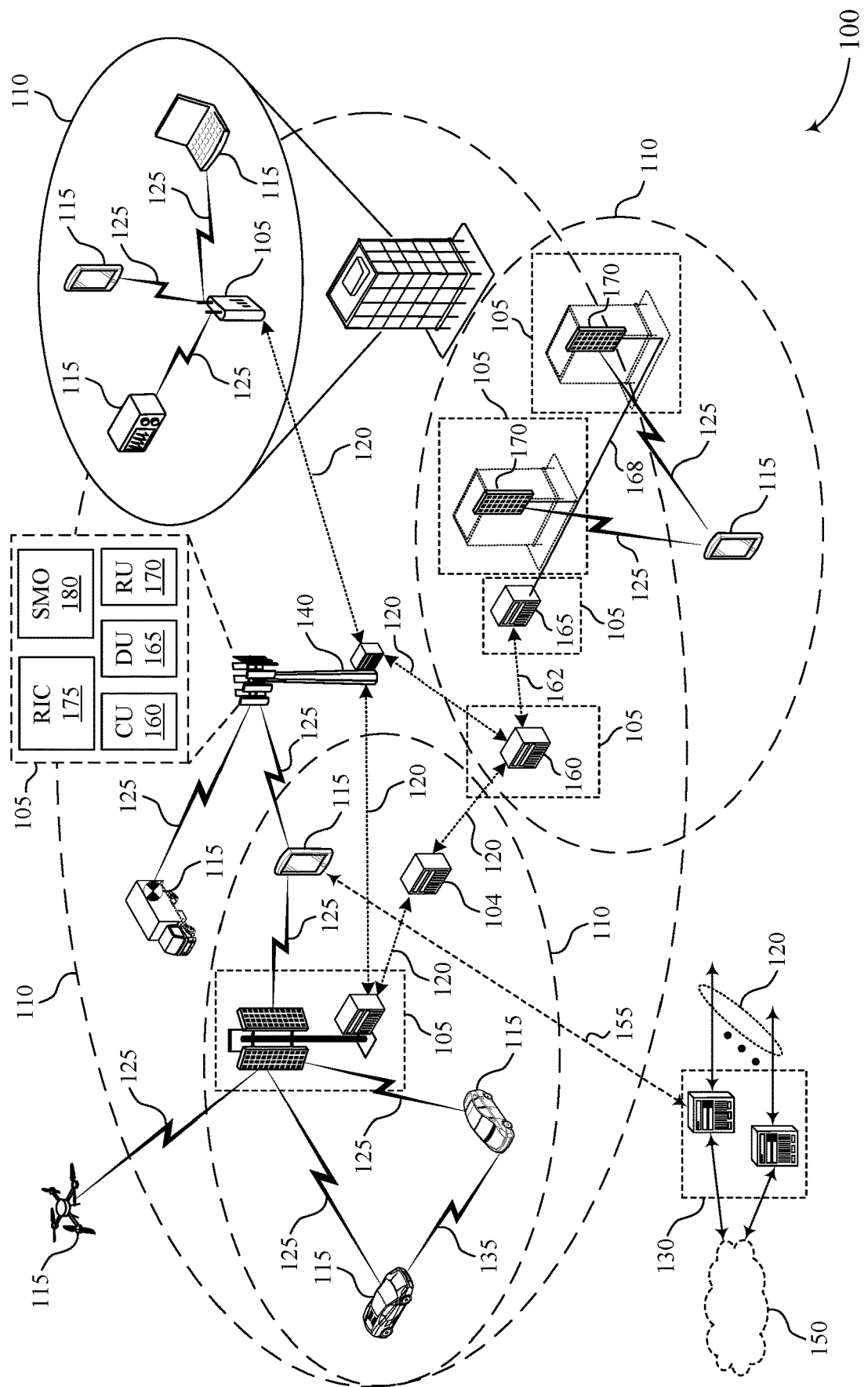
FIG. 1 illustrates an example of a wireless communications system that supports retransmission optimization mechanisms in accordance with one or more aspects of the present disclosure.

Some wireless communications systems (e.g., non-terrestrial networks (NTNs) or ultra-reliable low-latency communication (URLLC) systems) may experience propagation delay. For example, a first network node, such as a user equipment (UE), may experience propagation delay due to the distance between the UE and a second network node, such as a network entity, communicating with the UE (e.g., a satellite entity). In some cases, the propagation delay between the UE and the network entity may increase based on the UE failing to decode a downlink transmission from the network entity. That is, the UE may fail to decode an initial transmission of a downlink signal and may receive one or more retransmissions of the downlink signal, where each of the one or more retransmissions is associated with additional propagation delay which may negatively impact performance. Similarly, a network entity (such as a base station) may fail to decode an initial transmission of an uplink signal from a UE and may receive one or more retransmissions of the uplink signal, which are also each associated with additional propagation delay.

Techniques described herein may support retransmission optimization mechanisms which may reduce propagation delay. In some cases, a first network node, such as a UE, may receive, from a second network node, such as a network entity, one or more signals, such as downlink signals, where each signal is received as an initial transmission and one or more retransmissions and each transmission is associated with a redundancy version (RV) index. Further, the initial transmission and the one or more retransmissions associated with each signal may be transmitted according to a first RV index order. For example, the UE may receive an initial transmission of a downlink signal with a RV index of 0 and may receive subsequent retransmissions of the downlink signal with RV indices of 2, 3, and 1 (in that order). The UE may monitor the initial transmission and one or more retransmissions of each downlink signal (e.g., during a duration associated with a timer) to determine an error metric, such as a block error rate (BLER), associated with each RV index from the first RV index order. In some cases, the UE may compare the error metrics associated with each RV index and may transmit a request, to the network entity, to transmit future downlink signals according to a second (e.g., new) RV index order based on the comparison. The network entity may receive the request and transmit the future downlink signals according to the second RV index order, which may reduce propagation delay.

In some cases, the first network node may be a network entity and the second network node may be a UE. In such cases, the network entity may receive, from the UE, one or more uplink signals, where each uplink signal is received as an initial transmission and one or more retransmissions and each transmission is associated with a RV index and transmitted according to a first RV index order. The network entity may perform a similar process as described previously, in which the network entity monitors the initial transmission and the one or more retransmissions of each uplink signal to determine an error metric associated with each RV index from the first RV index order. Additionally, the network entity may compare the error metrics associated with each RV index and may transmit a request, to the UE, to transmit future uplink signals according to a second RV index order based on the comparison. The UE may receive the request and transmit the future uplink signals according to the second RV index order, which may reduce propagation delay Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to retransmission optimization mechanisms.

FIG. 1 illustrates an example of a wireless communications system 100 that supports retransmission optimization mechanisms in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network node, a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170).

A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support retransmission optimization mechanisms as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a network node, a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and N f may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support URLLC. The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support retransmission optimization mechanisms which may reduce propagation delay. In some cases, a first network node, such as a UE 115, may receive, from a second network node, such as a network entity 105, one or more signals, such as downlink signals, according to a first RV index order, where each signal is received as an initial transmission and one or more retransmissions and each transmission is associated with an RV index from the first RV index order. For example, the UE 115 may receive an initial transmission of a downlink signal with a RV index of 0 and may receive subsequent retransmissions of the downlink signal with RV indices of 2, 3, and 1 (in that order). The UE may monitor the initial transmission and the one or more retransmissions of each downlink signal to determine an error metric, such as a block error rate (BLER), associated with each RV index from the first RV index order. In some cases, the UE 115 may compare the error metrics associated with each RV index and may transmit a request, to the network entity 105, to transmit future downlink signals according to a second RV index order based on the comparison. The network entity 105 may receive the request and transmit the future downlink signals according to the second RV index order, which may reduce propagation delay.

In other examples, the first network node may be a network entity 105 and the second network node may be a UE 115.

Figure 2:
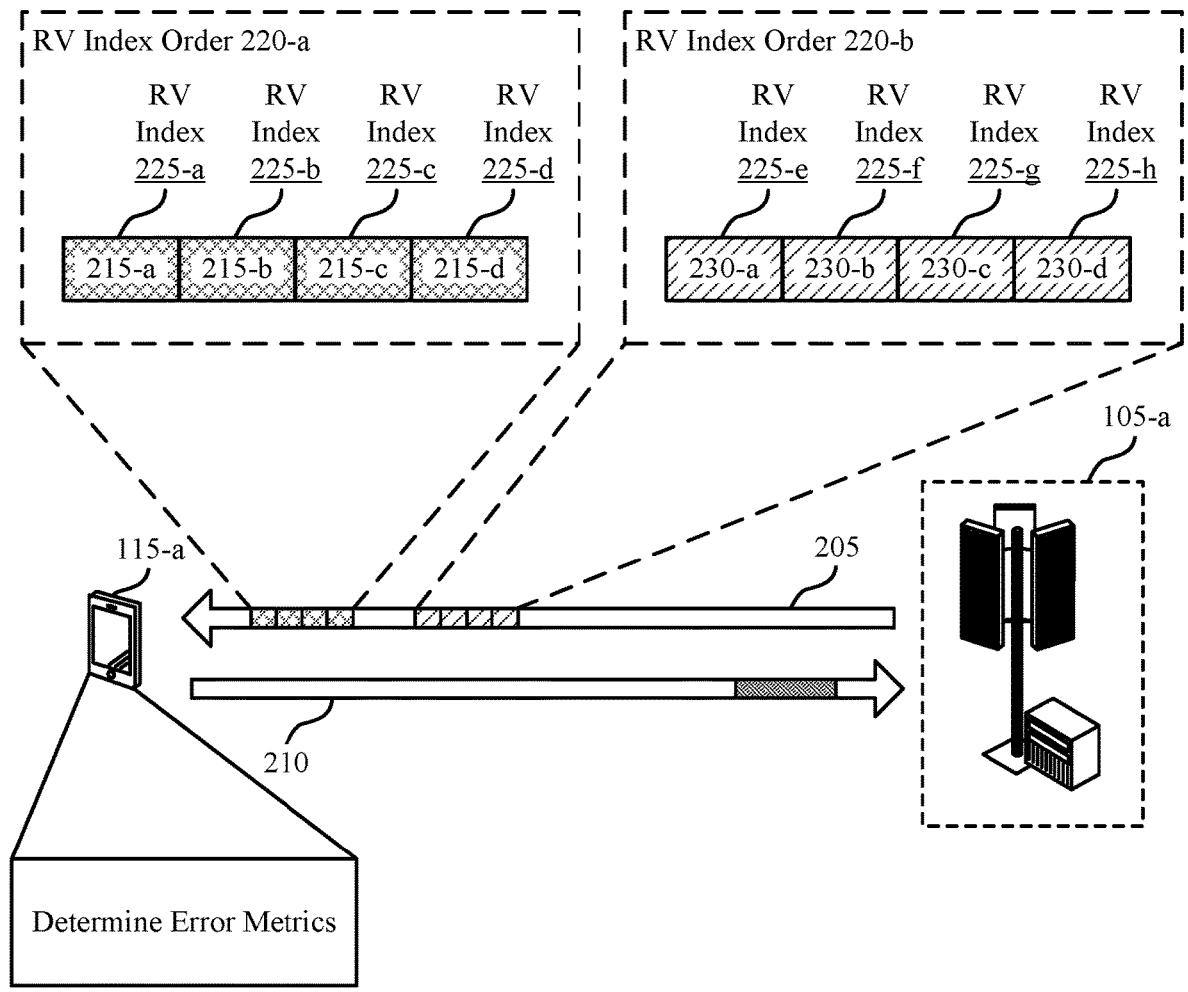
FIG. 2 illustrates an example of a wireless communications system that supports retransmission optimization mechanisms in accordance with one or more aspects of the present disclosure.

FIG. 2 illustrates an example of a wireless communications system 200 that supports retransmission optimization mechanisms in accordance with one or more aspects of the present disclosure. The wireless communications system 200 may implement or be implemented by aspects of the wireless communications system 100. For example, the wireless communications system 200 may include a network entity 105-*a* and a UE 115-*a*. The UE 115-*a* may represent an example of a UE 115 as described herein, including with reference to FIG. 1. The network entity 105-*a* may represent an example of a network entity 105 as described herein, including with reference to FIG. 1. Additionally, the network entity 105-*a* may transmit downlink signals via a communication link 205 and the UE 115-*a* may transmit uplink signals via a communication link 210. For example, the UE 115-*a* may transmit, to the network entity 105-*a*, a request message 235 requesting that the network entity 105-*a* transmit future downlink signals according to an RV index order indicated in the request message 235.

Some wireless communications systems may support retransmission mechanisms. For example, a network entity 105 may transmit, to a UE 115, one or more downlink signals according to an RV index order (e.g., RV 0, RV 2, RV 3, RV 1), where the RV index order indicates an order in which the network entity 105 may transmit an initial transmission of a downlink signal and one or more retransmissions of the downlink signal based on RV indices associated with each transmissions. That is, the network entity 105 may transmit an initial transmission of a downlink signal according to a first RV index and each retransmission of the downlink signal according to a respective RV index based on the RV index order. Each RV index may indicate, to the UE 115, the amount of redundancy added into codewords associated with the transmission while encoding. Transmissions associated with self-decodable RVs (e.g., transmissions associated with self-decodable RV indices such as RV 0 and RV 3) may include all system information bits of an associated downlink signal such that the UE 115 may decode the transmission without use of information from other transmissions of the downlink signal (e.g., the UE 115 can decode the transmission on its own). Transmissions associated with non-self-decodable RVs (e.g., transmissions associated with non-self-decodable RV indices such as RV 2 and RV 1) may include a subset of the system information bits of the associated downlink signal, such that the UE 115 may decode a non-self-decodable transmission using information stored from previous transmissions of the downlink signal (e.g., the UE 115 cannot decode the transmission on its own). That is, a UE 115 may fail to decode a transmission of a downlink signal with a self-decodable RV index and may store a subset of packets associated with the transmission of the downlink signal, such that the UE 115 may use the subset of packets when attempting to decode a future retransmission of the downlink signal with a non-self-decodable RV index.

For example, a UE 115 may receive, from a network entity 105, an initial transmission of a downlink signal, including packets, with an RV index of 0 (e.g., self-decodable) and may fail to decode the initial transmission. However, the UE 115 may store a subset of the packets (e.g., in a buffer) that the UE 115 was able to decode. In some cases, the network entity 105 may transmit a first retransmission of the downlink signal with an RV index of 2 (e.g., non-self-decodable) based on an RV index order. The UE 115 may attempt to decode the first retransmission using the stored subset of packets. In some cases, the UE 115 may fail to decode the first retransmission and the network entity 105 may transmit a second retransmission of the downlink signal with an RV index of 3 (e.g., self-decodable) based on the RV index order and the UE 115 may attempt to decode the second retransmission (e.g., without using stored packets from previous transmissions). In some cases, the UE 115 may fail to decode the second retransmission of the network entity 105 may continue to transmit retransmissions of the downlink signal according to the RV index order.

Additionally, some wireless communications systems (e.g., NTNs or URLLC systems) may experience propagation delay which, in some cases, may increase due to conventional retransmission mechanisms. For example, a UE 115 may communicate with a network entity 105, such as a satellite entity, via an NTN communication system and may experience propagation delay greater than 100 ms due to the proximity of the UE 115 to the network entity 105 (e.g., 238-541 ms for a geosynchronous equatorial orbit (GEO) satellite entity and 4-25 ms for a low-earth orbit (LEO) satellite entity). In some cases, the UE 115 may fail to receive an initial transmission from the network entity 105 and may transmit a feedback message (e.g., HARQ) to the network entity 105 indicating the failed transmission, which may increase the propagation delay between the UE 115 and the network entity 105 (e.g., the network entity 105 may wait to receive the feedback message prior to transmitting one or more retransmissions of the downlink signal). In some cases, the UE 115 may disable transmission of feedback messages or employ feedback optimization techniques to reduce the propagation delay. However, current techniques may not be effective when the UE 115 fails to decode the initial transmission and/or the one or more retransmissions. For example, the network entity 105 may transmit an initial transmission of a downlink signal, where the initial transmission is associated with a self-decodable RV index (e.g., RV 0) and is transmitted according to an RV index order. The UE 115 may fail to receive or decode the initial transmissions and the network entity 105 may transmit a first retransmission of the downlink signal (e.g., after an order of 100 ms) according to the RV index order, where the first retransmission is associated with a non-self-decodable RV index (e.g., RV 2). In some cases, the UE 115 may fail to decode the first retransmission and the network entity may transmit a second retransmission of the downlink signal (e.g., after an order of 100 ms) according to the RV index order, where the second transmission is associated with a self-decodable RV index (e.g., RV 3). In such cases, the UE 115 may decode the second retransmission with high probability (e.g., it is very likely the UE 115 will be able to decode the second retransmission based on the self-decodable RV index). Therefore, the UE 115 (e.g., operating in a delay constraint scenario) may experience increased propagation delay due to the UE 115 being unable to receive or decode the first transmission associated with the non-self-decodable RV and successfully receiving and decoding the second retransmission associated with the self-decodable RV index (e.g., upon failing to receive or decode an initial transmission of a downlink signal, the UE 115 may have to wait for a retransmission of the downlink signal associated with a self-decodable RV, which may be based on an RV index order).

Techniques described herein may support retransmission optimization mechanisms which may reduce propagation delay and decrease power consumption. In some cases, a UE 115-a may receive one or more downlink signals, such as a downlink signal 215, from a network entity 105-a, where the downlink signal 215 is received as an initial transmission, such as downlink signal 215-a, and one or more retransmissions, such as a downlink signal 215-b, a downlink signal 215-c, and a downlink signal 215-d. Additionally, the UE 115-a may receive the downlink signal 215-a, the downlink signal 215-b, the downlink signal 215-c, and the downlink signal 215-d according to an RV index order 220-a. That is, the UE 115-a may receive the downlink signal 215-a with an RV index 225-a (e.g., RV 0), the downlink signal 215-b with an RV index 225-b (e.g., RV 2), the downlink signal 215-c with an RV index 225-c (e.g., RV 3), and the downlink signal 215-d with an RV index 225-d based on the RV index order 220-a (e.g., RV 1).

In some cases, the UE 115-a may monitor the one or more downlink signals, including the downlink signal 215, to determine an error metric, such as a BLER, associated with each RV index 225. For example, the UE 115-a may determine a BLER associated with the RV index 225-b and a BLER associated with the RV index 225-c. In some cases, the UE 115-a may monitor the one or more downlink signals to determine the error metrics according to a timer. That is, the UE 115-a may start a timer and monitor transmissions of the one or more downlink signals during a duration (e.g., an order of 100 ms) associated with the timer and may determine a BLER associated with each RV index 225 during the duration. For example, the UE 115-a may determine a BLER for each transmission of a downlink signal associated with the RV index 225-b, such as downlink signal 215-b, and determine an average BLER associated with the RV index 225-b based on the BLERs for each transmission (e.g., upon expiration of the timer).

In some cases, the UE 115-a may compare the BLERs associated with each RV index 225 and may transmit a request message 235 (e.g., via UCI or MAC CE) requesting that the network entity 105-a transmit future downlink signals, such as a downlink signal 230, according to an RV index order 220-b (e.g., using self-decodable RV indices 225) based on the comparison. For example, the UE 115-a may determine a BLER associated with the RV index 225-b is greater than a BLER associated with the RV index 225-c and may transmit the request message 235 based on the BLER associated with the RV index 225-b being greater than the BLER associated with the RV index 225-c.

The network entity 105-a may receive the request message 235 and transmit the future downlink signals, such as the downlink signal 230, according to the RV index order 220-b. For example, a downlink signal 230-a may be an initial transmission of the downlink signal 230 and the network entity 105-a may transmit the downlink signal 230-a with an RV index 225-e based on the RV index order 220-b. Additionally, the network entity 105-a may transmit a downlink signal 230-b (e.g., a first retransmission of the downlink signal 230) with an RV index 225-f, a downlink signal 230-c (e.g., a second retransmission of the downlink signal 230) with an RV index 225-g, and a downlink signal 230-d (e.g., a third retransmission of the downlink signal 230) with an RV index 225-h based on the RV index order 220-b requested by the UE 115-a. In some cases, the RV index 225-e may be the same as the RV index 225-g (e.g., RV 0) and the RV index 225-f may be the same as the RV index 225-h (e.g., RV 3). Additionally, the RV index 225-e may be the same as the RV index 225-a and the RV index 225-f may be the same as the RV index 225-c.

While much of the present disclosure is described in the context of downlink signaling between the UE 115-a and the network entity 105-a, this is not to be regarded as a limitation of the present disclosure. Indeed, it is contemplated herein that a first network node, such as a UE 115-a, may receive signals, such as downlink signals 230, from a second network node, such as the network entity 105-a. In this regard, uplink signals may be considered with regards to the techniques described herein. That is, a network entity 105, which may be an example of a first network node, may receive uplink signals, which may be example of signals, from a UE 115, which may be an example of a second network node, and may employ techniques described herein to support retransmission optimization mechanisms.

Figure 3:
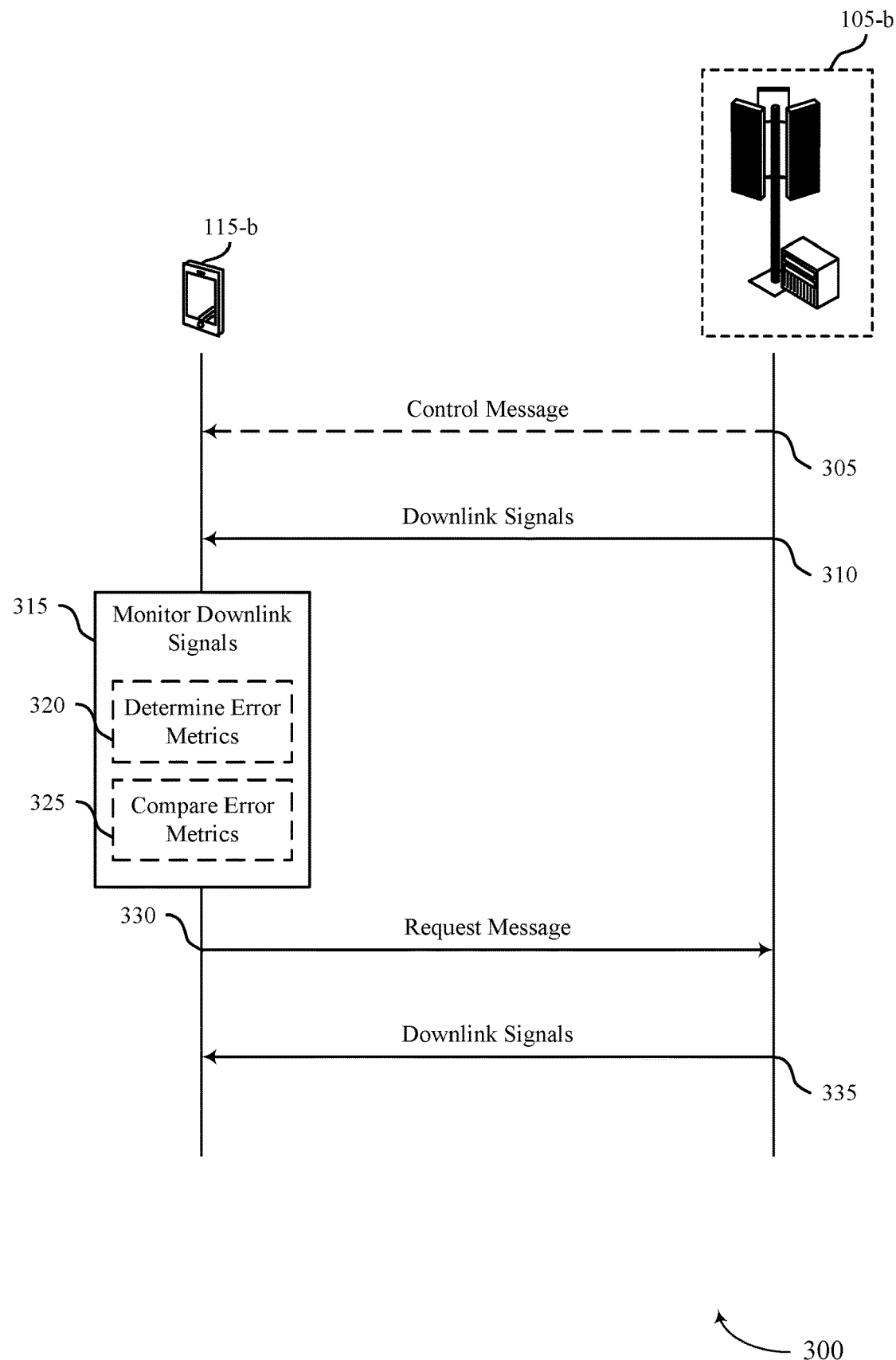
FIG. 3 illustrates an example of a process flow that supports retransmission optimization mechanisms in accordance with one or more aspects of the present disclosure.

FIG. 3 illustrates an example of a process flow 300 that supports retransmission optimization mechanisms in accordance with one or more aspects of the present disclosure. The process flow 300 may implement or be implemented by aspects of the wireless communications system 100 and the wireless communications system 200. For example, the process flow 300 may include a network entity 105-b and a UE 115-b. The UE 115-b may represent an example of a UE 115 as described herein, including with reference to FIG. 1. The network entity 105-b may represent an example of a network entity 105 as described herein, including with reference to FIG. 1. In some cases, the UE 115-b may transmit, to the network entity 105-b, a request to transmit future downlink signals according to a requested RV index order.

In some cases, at 305, a first network node, such as the UE 115-*b*, may receive, from a second network node, such as the network entity 105-*b*, a control message indicating a first RV index order (e.g., RV 0, RV 2, RV 3, RV 1), where the first RV index order includes self-decodable RVs (e.g., RV indices), non-self-decodable RVs, or both. Alternatively, the first RV index order may be based on one or more parameters at the UE 115-*b* (e.g., the first RV index order may be preconfigured at the UE 115-*b*). Additionally, the UE 115-*b* may communicate with the network entity 105-*b* via an NTN, using URLLC communications, or both.

At 310, the network entity 105-*b* may transmit one or more signals, such as downlink signals, each of the one or more downlink signals transmitted as an initial transmission and as one or more retransmissions in accordance with the first RV index order. The first RV index order may specify (e.g., assign) RV indices for each of the initial transmission and the one or more retransmissions.

For example, the UE 115-*b* may fail to decode the initial transmission of the downlink signal, which may be associated with a first RV index, and may transmit a feedback message to the network entity 105-*b* indicating that the UE failed to decode the initial transmission. The network entity 105-*b* may receive the feedback message and may transmit a first retransmission of the downlink signal, which may be associated with a second RV index, in accordance with the first RV index order.

At 315, the UE 115-*b* may monitor the initial transmission and the one or more retransmissions for each of the one or more downlink signals to determine an error metric associated with each RV index of the first RV index order. In some cases, the UE 115-*b* may monitor the initial transmission and the one or more retransmissions for each of the one or more downlink signals during a duration associated with a timer (e.g., which may be indicated in the control message or may be pre-configured at the UE 115-*b*).

For example, at 320, the UE 115-*a* may monitor the initial transmission and the one or more retransmissions for each of the one or more downlink signals to determine a first error metric associated with a first RV index of the first RV index order and a second error metric associated with a second RV index of the first RV index order. In some cases, the UE 115-*b* may determine the error metrics by measuring a BLER of the initial transmission and the one or more retransmissions. Additionally, at 325, the UE 115-*b* may compare the first error metric to the second error metric and may determine that first error metric is less than the second error metric.

At 330, may transmit a request (e.g., request message) for the network entity 105-*b* to transmit future downlink signals in accordance with a second RV index order (e.g., RV 0, RV 3, RV 0, RV 3) based on the monitoring (e.g., via UCI or MAC-CE). In some cases, the UE 115-*b* may transmit the request upon expiration of the timer. Additionally, the second RV index order may include self-decodable RVs (e.g., RV indices)

At 335, the network entity 105-*b* may transmit future downlink signals in accordance with the second RV index order based on the request.

Figure 4:
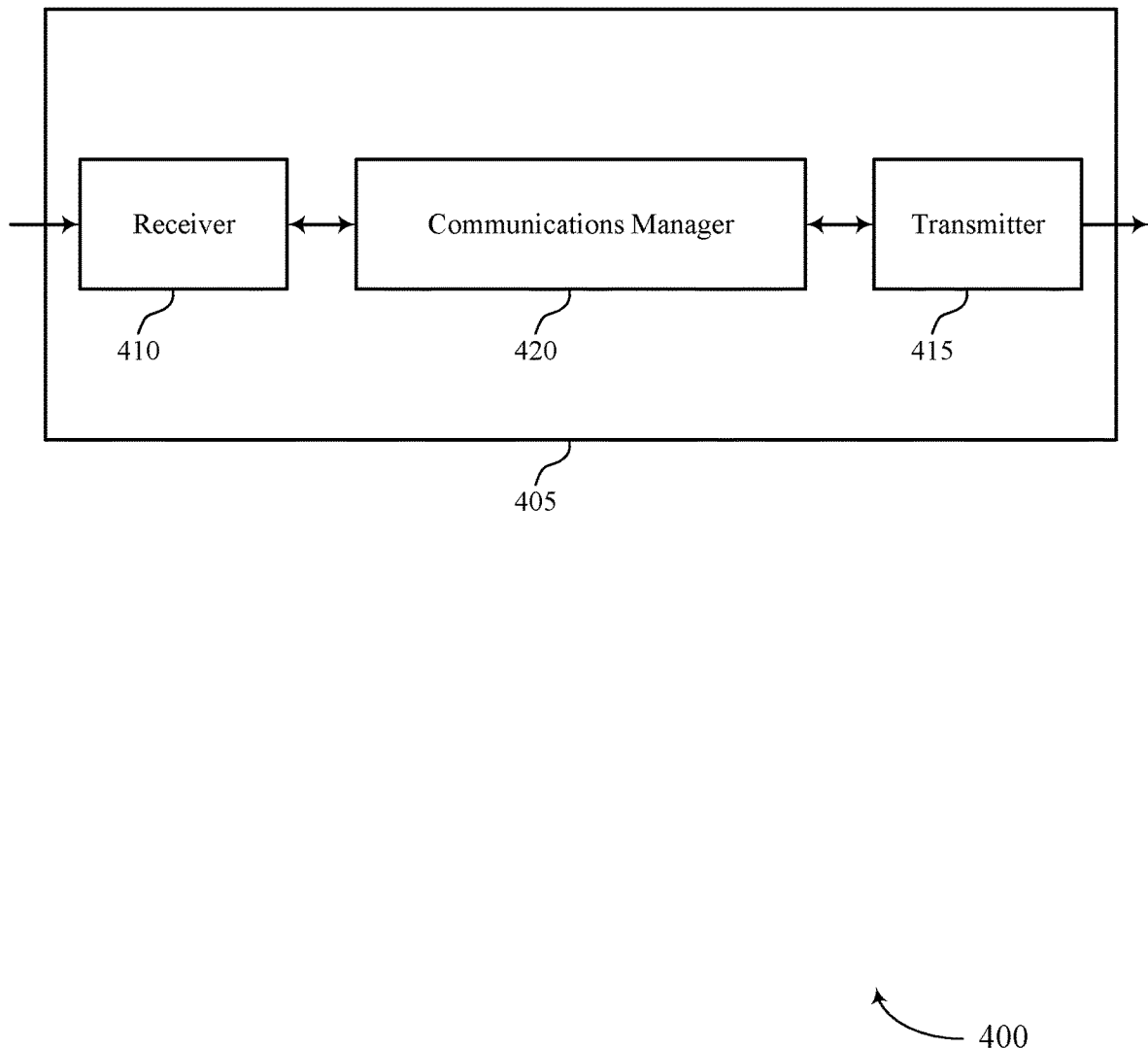
FIGS. 4 and 5 show block diagrams of devices that support retransmission optimization mechanisms in accordance with one or more aspects of the present disclosure.

FIG. 4 shows a block diagram 400 of a device 405 that supports retransmission optimization mechanisms in accordance with one or more aspects of the present disclosure. The device 405 may be an example of aspects of a first network node, such as a UE 115 or a network entity 105, as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to retransmission optimization mechanisms). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to retransmission optimization mechanisms). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of retransmission optimization mechanisms as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a first network node in accordance with examples as disclosed herein. For example, the communications manager 420 may be configured as or otherwise support a means for receiving, from a second network node, one or more signals, each of the one or more signals received as an initial transmission and as one or more retransmissions in accordance with a first RV index order which specifies respective RV indices for each of the initial transmission and the one or more retransmissions. The communications manager 420 may be configured as or otherwise support a means for monitoring the initial transmission and the one or more retransmissions for each of the one or more signals to determine an error metric associated with each RV index of the first RV index order. The communications manager 420 may be configured as or otherwise support a means for transmitting a request for the second network node to transmit future signals in accordance with a second RV index order based on the monitoring.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for retransmission optimization mechanisms which may result in reduced processing, reduced power consumption, and more efficient utilization of communication resources, among other advantages.

Figure 5:
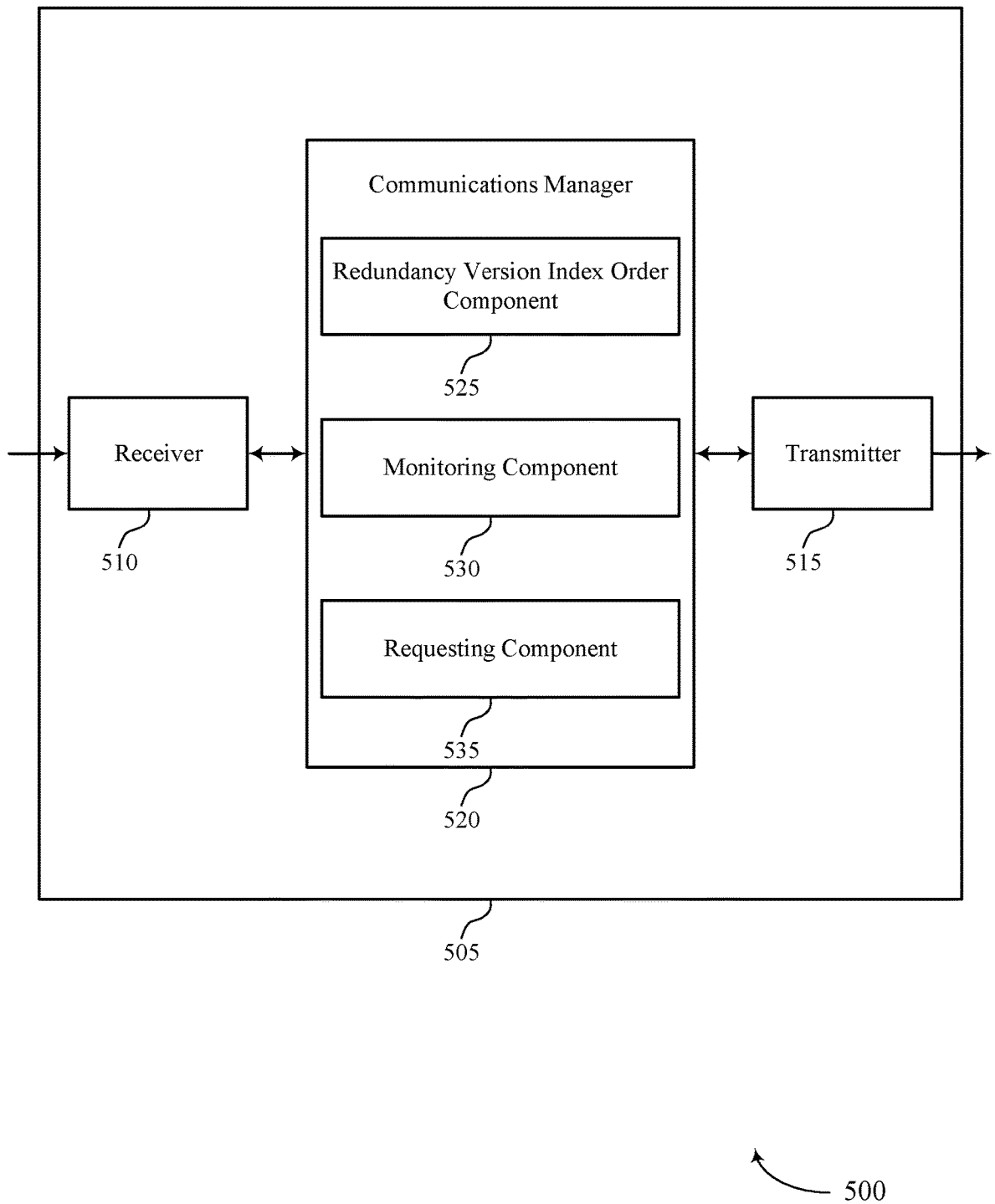

FIG. 5 shows a block diagram 500 of a device 505 that supports retransmission optimization mechanisms in accordance with one or more aspects of the present disclosure. The device 505 may be an example of aspects of a device 405 or a first network node, such as a UE 115 or a network entity 105, as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to retransmission optimization mechanisms). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to retransmission optimization mechanisms). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of retransmission optimization mechanisms as described herein. For example, the communications manager 520 may include a RV index order component 525, a monitoring component 530, a requesting component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first network node in accordance with examples as disclosed herein. The RV index order component 525 may be configured as or otherwise support a means for receiving, from a second network node, one or more signals, each of the one or more signals received as an initial transmission and as one or more retransmissions in accordance with a first RV index order which specifies respective RV indices for each of the initial transmission and the one or more retransmissions. The monitoring component 530 may be configured as or otherwise support a means for monitoring the initial transmission and the one or more retransmissions for each of the one or more signals to determine an error metric associated with each RV index of the first RV index order. The requesting component 535 may be configured as or otherwise support a means for transmitting a request for the second network node to transmit future signals in accordance with a second RV index order based on the monitoring.

Figure 6:
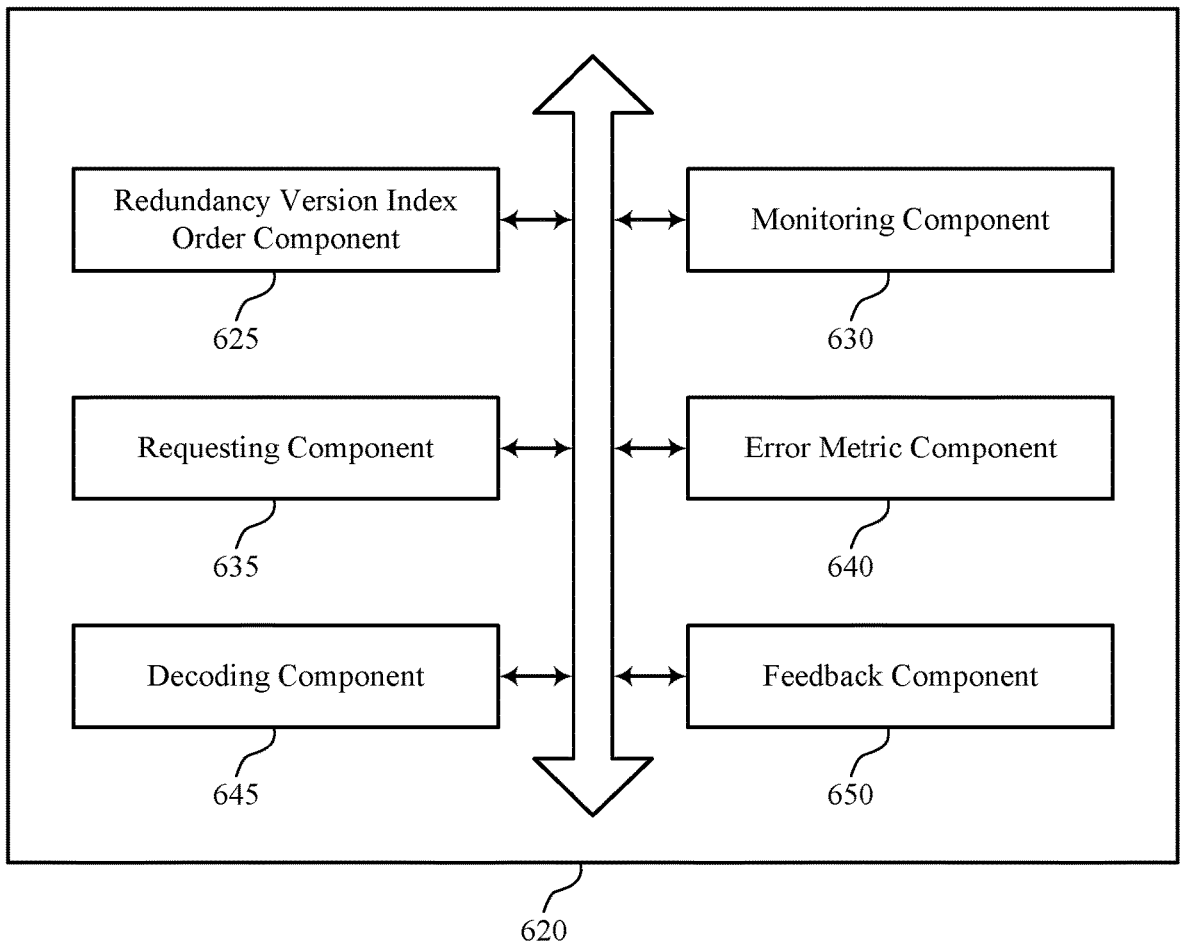
FIG. 6 shows a block diagram of a communications manager that supports retransmission optimization mechanisms in accordance with one or more aspects of the present disclosure.

FIG. 6 shows a block diagram 600 of a communications manager 620 that supports retransmission optimization mechanisms in accordance with one or more aspects of the present disclosure. The communications manager 620 may be an example of aspects of a communications manager 420, a communications manager 520, or both, as described herein. The communications manager 620, or various components thereof, may be an example of means for performing various aspects of retransmission optimization mechanisms as described herein. For example, the communications manager 620 may include a RV index order component 625, a monitoring component 630, a requesting component 635, an error metric component 640, a decoding component 645, a feedback component 650, or any combination thereof. Each of these components may communicate, directly or indirectly, with one another (e.g., via one or more buses).

The communications manager 620 may support wireless communications at a first network node in accordance with examples as disclosed herein. The RV index order component 625 may be configured as or otherwise support a means for receiving, from a second network node, one or more signals, each of the one or more signals received as an initial transmission and as one or more retransmissions in accordance with a first RV index order which specifies respective RV indices for each of the initial transmission and the one or more retransmissions. The monitoring component 630 may be configured as or otherwise support a means for monitoring the initial transmission and the one or more retransmissions for each of the one or more signals to determine an error metric associated with each RV index of the first RV index order. The requesting component 635 may be configured as or otherwise support a means for transmitting a request for the second network node to transmit future signals in accordance with a second RV index order based on the monitoring.

In some examples, to support monitoring the initial transmission and the one or more retransmissions for each of the one or more signals, the monitoring component 630 may be configured as or otherwise support a means for monitoring the initial transmission and the one or more retransmissions for each of the one or more signals to determine a first error metric associated with a first RV index of the first RV index order and a second error metric associated with a second RV index of the first RV index order. In some examples, to support monitoring the initial transmission and the one or more retransmissions for each of the one or more signals, the error metric component 640 may be configured as or otherwise support a means for comparing the first error metric associated with the first RV index to the second error metric associated with the second RV index, where transmitting the request is based on the comparison.

In some examples, the error metric component 640 may be configured as or otherwise support a means for determining that the first error metric associated with the first RV index is less than the second error metric associated with the second RV index, where transmitting the request is based on the determining.

In some examples, to support monitoring the initial transmission and the one or more retransmissions for each of the one or more signals, the monitoring component 630 may be configured as or otherwise support a means for monitoring the initial transmission and the one or more retransmissions for each of the one or more signals to determine the error metric associated with each RV index of the first RV index order during a duration associated with a timer, where transmitting the request is based on expiration of the timer.

In some examples, to support receiving the one or more signals, the RV index order component 625 may be configured as or otherwise support a means for receiving the one or more signals, each of the one or more signals received as the initial transmission and as the one or more retransmissions in accordance with the first RV index order, where the first RV index order includes self-decodable RVs, non-self-decodable RVs, or both.

In some examples, the first RV index order includes a RV index order of zero, two, three, and then one.

In some examples, to support transmitting the request, the requesting component 635 may be configured as or otherwise support a means for transmitting the request for the second network node to transmit the future signals in accordance with the second RV index order, where the second RV index order includes self-decodable RVs.

In some examples, to support monitoring the initial transmission and the one or more retransmissions for each of the one or more signals, the error metric component 640 may be configured as or otherwise support a means for measuring a block error rate of the initial transmission and the one or more retransmissions, where the error metric associated with each RV index of the first RV index order is based on the measuring.

In some examples, the RV index order component 625 may be configured as or otherwise support a means for receiving the future signals in accordance with the second RV index order.

In some examples, the second RV index order includes a RV index order of zero, three, zero, and then three.

In some examples, to support transmitting the request, the requesting component 635 may be configured as or otherwise support a means for transmitting the request for the second network node to transmit the future signals in accordance with the second RV index order via uplink control information or a medium access control-control element.

In some examples, the first network node communicates via an NTN or using URLLC communications.

In some examples, the first RV index order is based on one or more parameters at the first network node.

In some examples, the RV index order component 625 may be configured as or otherwise support a means for receiving a second control message indicating the first RV index order.

In some examples, the decoding component 645 may be configured as or otherwise support a means for failing to decode the initial transmission. In some examples, the feedback component 650 may be configured as or otherwise support a means for transmitting a feedback message including an indication that the first network node failed to decode the initial transmission, where receiving the one or more retransmissions is based on the feedback message.

Figure 7:
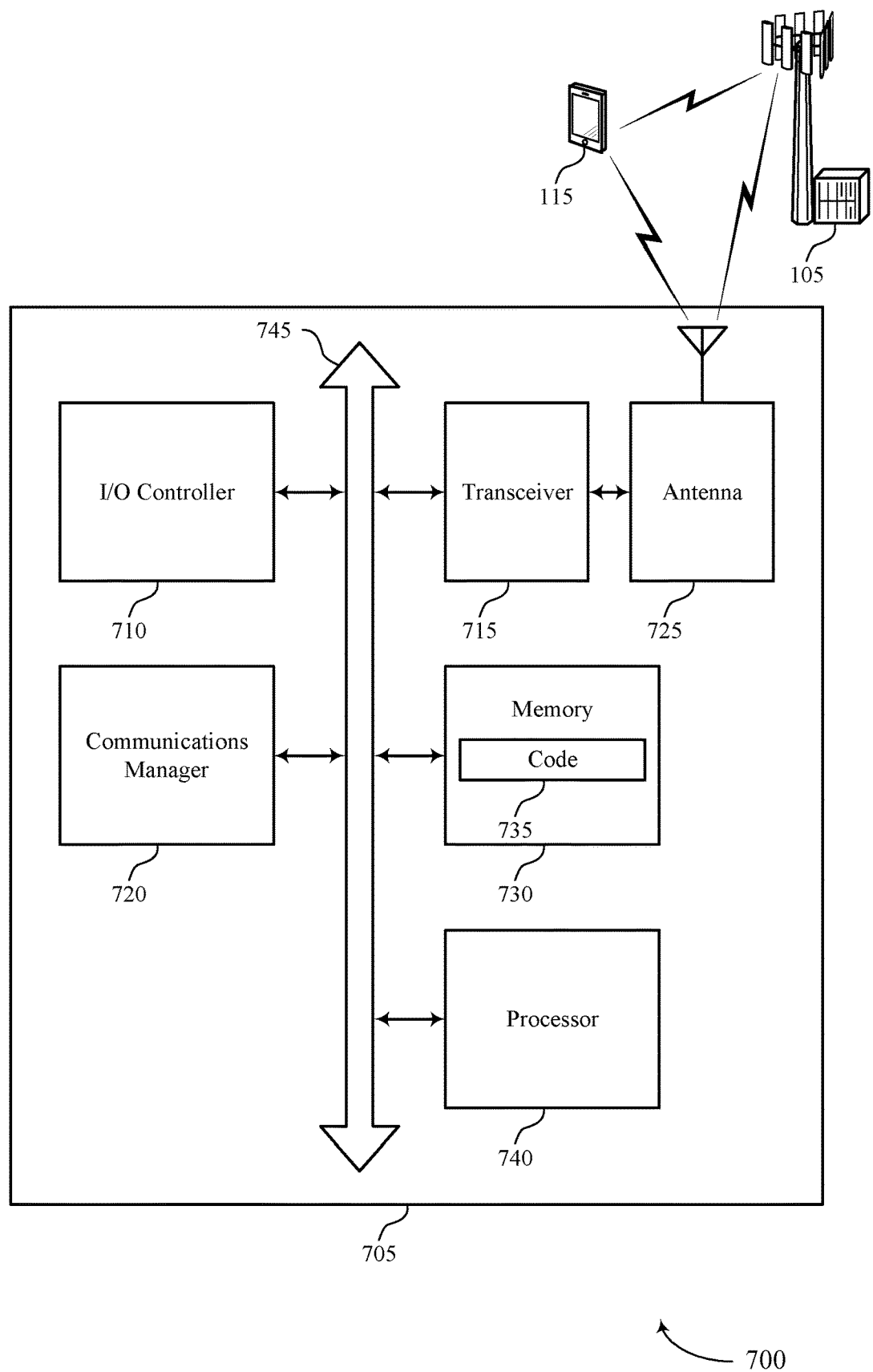
FIG. 7 shows a diagram of a system including a device that supports retransmission optimization mechanisms in accordance with one or more aspects of the present disclosure.

FIG. 7 shows a diagram of a system 700 including a device 705 that supports retransmission optimization mechanisms in accordance with one or more aspects of the present disclosure. The device 705 may be an example of or include the components of a device 405, a device 505, or a first network node, such as a UE 115 or a network entity 105, as described herein. The device 705 may communicate (e.g., wirelessly) with one or more network nodes, such as one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting retransmission optimization mechanisms). For example, the device 705 or a component of the device 705 may include a processor 740 and memory 730 coupled with or to the processor 740, the processor 740 and memory 730 configured to perform various functions described herein.

The communications manager 720 may support wireless communications at a first network node in accordance with examples as disclosed herein. For example, the communications manager 720 may be configured as or otherwise support a means for receiving, from a second network node, one or more signals, each of the one or more signals received as an initial transmission and as one or more retransmissions in accordance with a first RV index order which specifies respective RV indices for each of the initial transmission and the one or more retransmissions. The communications manager 720 may be configured as or otherwise support a means for monitoring the initial transmission and the one or more retransmissions for each of the one or more signals to determine an error metric associated with each RV index of the first RV index order. The communications manager 720 may be configured as or otherwise support a means for transmitting a request for the second network node to transmit future signals in accordance with a second RV index order based on the monitoring.

By including or configuring the communications manager 720 in accordance with examples as described herein, the device 705 may support techniques for retransmission optimization mechanisms which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of retransmission optimization mechanisms as described herein, or the processor 740 and the memory 730 may be otherwise configured to perform or support such operations.

Figure 8:
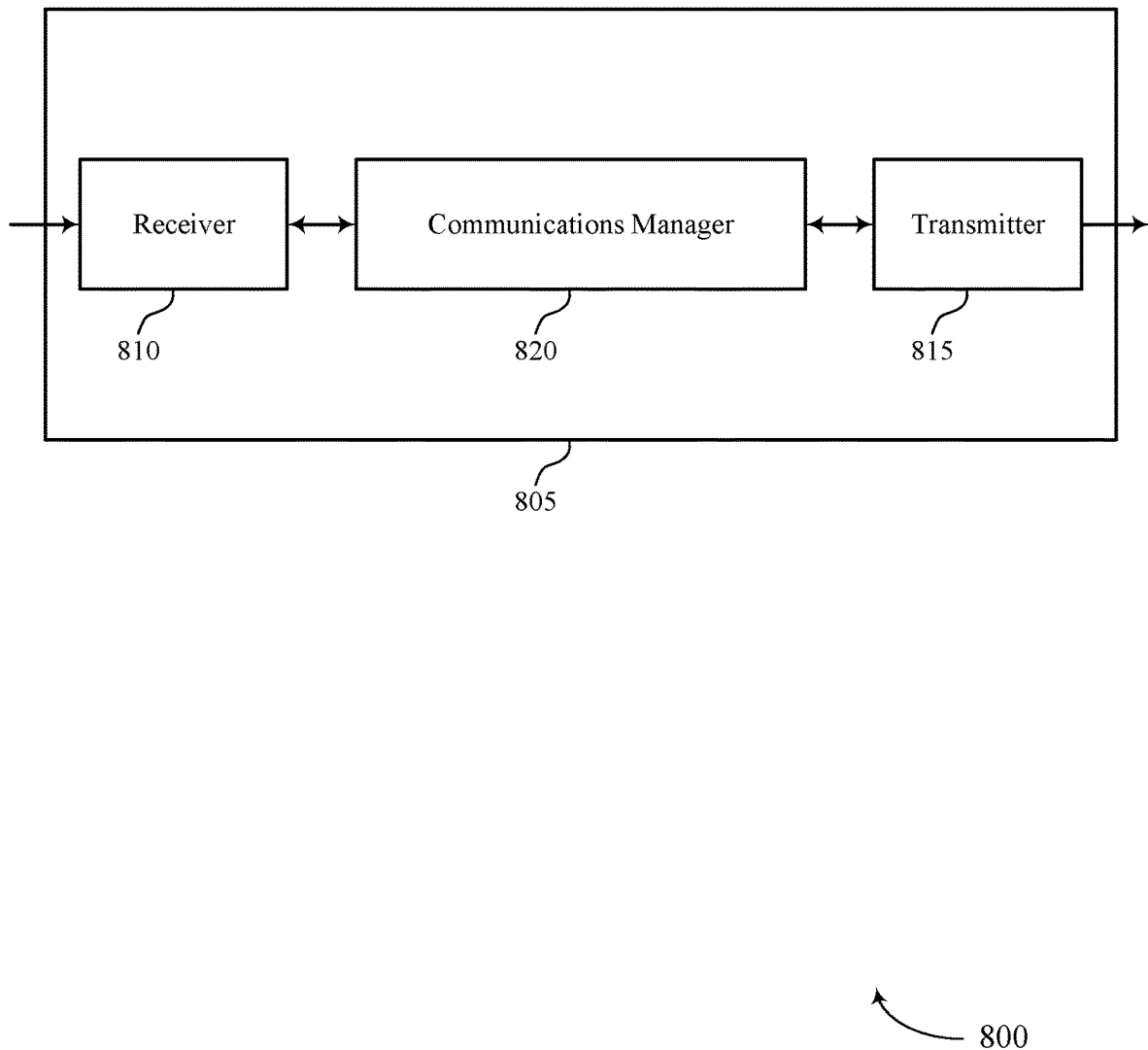
FIGS. 8 and 9 show block diagrams of devices that support retransmission optimization mechanisms in accordance with one or more aspects of the present disclosure.

FIG. 8 shows a block diagram 800 of a device 805 that supports retransmission optimization mechanisms in accordance with one or more aspects of the present disclosure. The device 805 may be an example of aspects of a second network node, such as a network entity 105 or a UE 115, as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of retransmission optimization mechanisms as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a second network node in accordance with examples as disclosed herein. For example, the communications manager 820 may be configured as or otherwise support a means for transmitting one or more signals, each of the one or more signals transmitted as an initial transmission and as one or more retransmissions in accordance with a first RV index order which specifies respective RV indices for each of the initial transmission and the one or more retransmissions. The communications manager 820 may be configured as or otherwise support a means for receiving a request that the second network node transmit future signals in accordance with a second RV index order. The communications manager 820 may be configured as or otherwise support a means for transmitting the future signals in accordance with the second RV index order.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for retransmission optimization mechanisms which may result in reduced processing, reduced power consumption, and more efficient utilization of communication resources, among other advantages.

Figure 9:
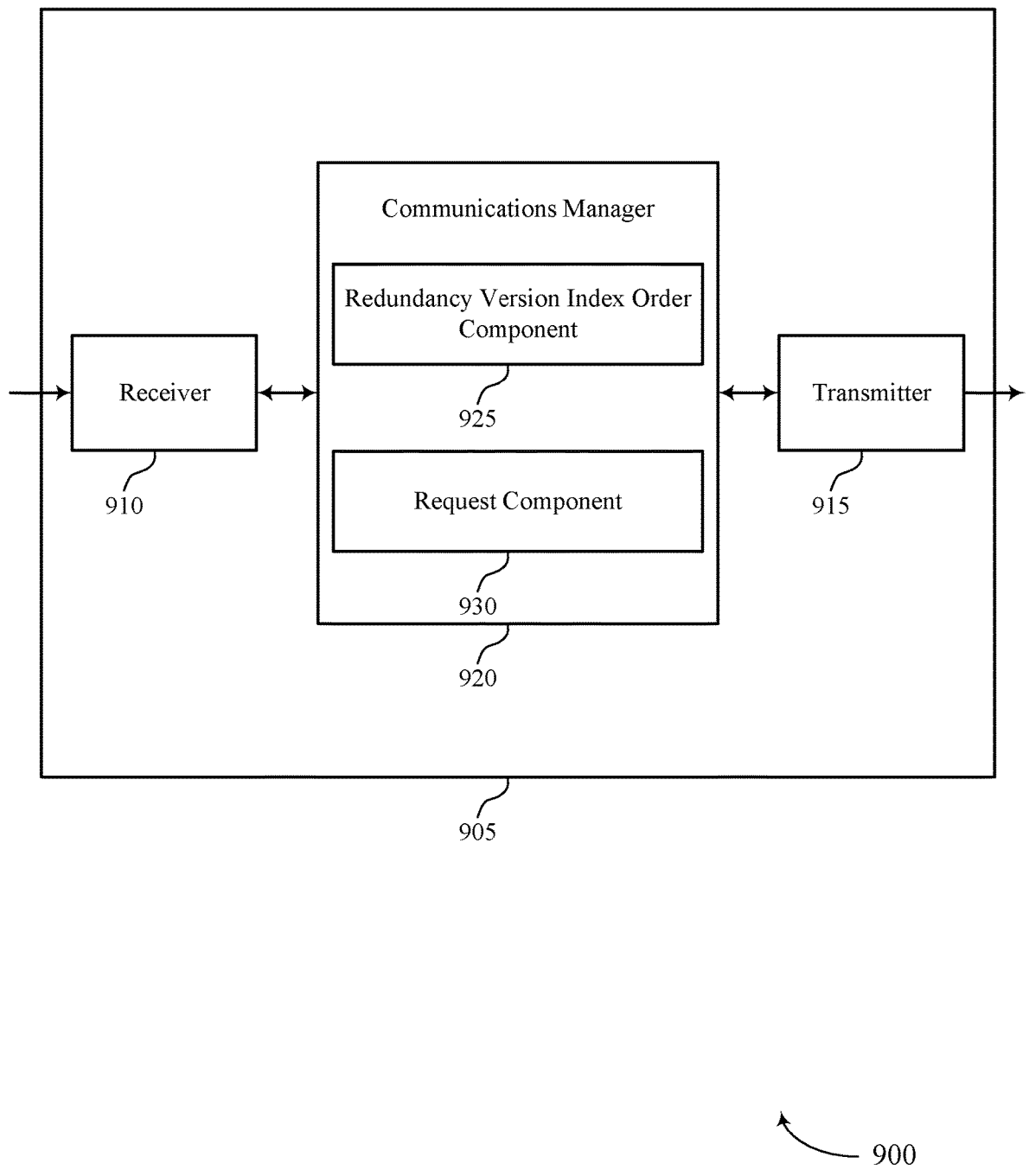

FIG. 9 shows a block diagram 900 of a device 905 that supports retransmission optimization mechanisms in accordance with one or more aspects of the present disclosure. The device 905 may be an example of aspects of a device 805 or a second network node, such as a network entity 105 or a UE 115, as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of retransmission optimization mechanisms as described herein. For example, the communications manager 920 may include a RV index order component 925 a request component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a second network node in accordance with examples as disclosed herein. The RV index order component 925 may be configured as or otherwise support a means for transmitting one or more signals, each of the one or more signals transmitted as an initial transmission and as one or more retransmissions in accordance with a first RV index order which specifies respective RV indices for each of the initial transmission and the one or more retransmissions. The request component 930 may be configured as or otherwise support a means for receiving a request that the second network node transmit future signals in accordance with a second RV index order. The RV index order component 925 may be configured as or otherwise support a means for transmitting the future signals in accordance with the second RV index order.

Figure 10:
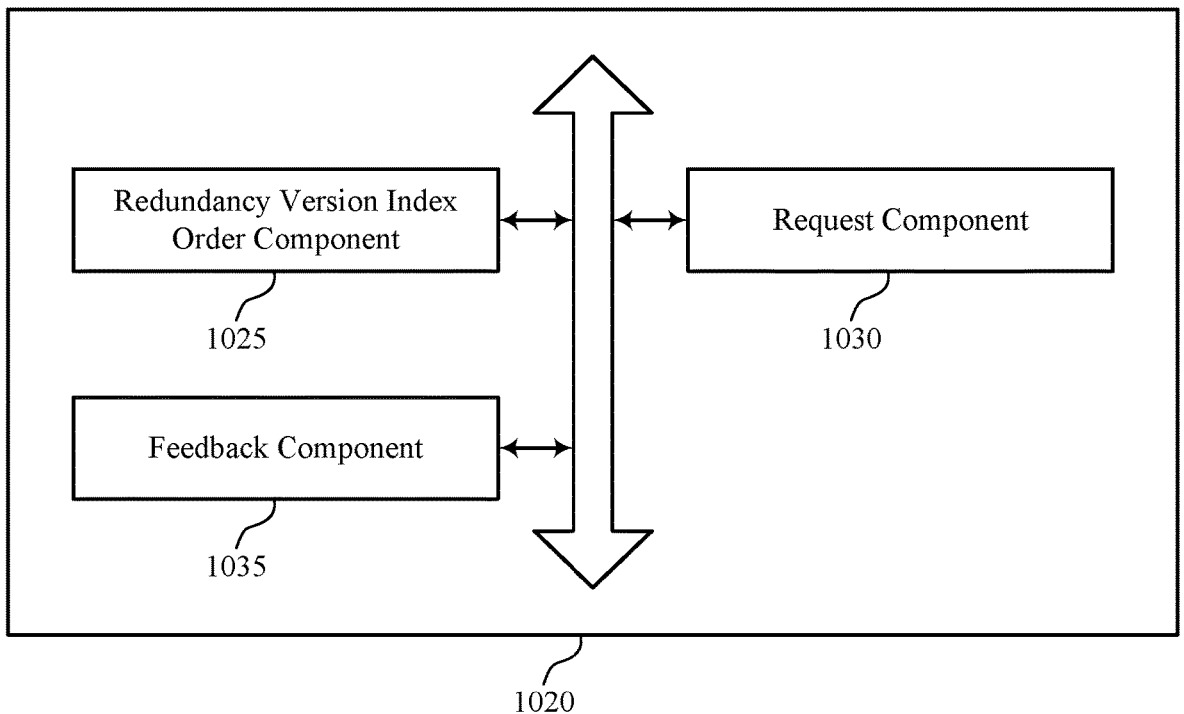
FIG. 10 shows a block diagram of a communications manager that supports retransmission optimization mechanisms in accordance with one or more aspects of the present disclosure.

FIG. 10 shows a block diagram 1000 of a communications manager 1020 that supports retransmission optimization mechanisms in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of retransmission optimization mechanisms as described herein. For example, the communications manager 1020 may include a RV index order component 1025, a request component 1030, a feedback component 1035, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a second network node, such as a network entity 105, between devices, components, or virtualized components associated with a second network node, such as a network entity 105), or any combination thereof.

The communications manager 1020 may support wireless communications at a second network node in accordance with examples as disclosed herein. The RV index order component 1025 may be configured as or otherwise support a means for transmitting one or more signals, each of the one or more signals transmitted as an initial transmission and as one or more retransmissions in accordance with a first RV index order which specifies respective RV indices for each of the initial transmission and the one or more retransmissions. The request component 1030 may be configured as or otherwise support a means for receiving a request that the second network node transmit future signals in accordance with a second RV index order. In some examples, the RV index order component 1025 may be configured as or otherwise support a means for transmitting the future signals in accordance with the second RV index order.

In some examples, to support transmitting the one or more signals, the RV index order component 1025 may be configured as or otherwise support a means for transmitting the one or more signals, each of the one or more signals transmitted as the initial transmission and as the one or more retransmissions in accordance with the first RV index order, where the first RV index order includes self-decodable RVs, non-self-decodable RVs, or both.

In some examples, the first RV index order includes a RV index order of zero, two, three, and then one.

In some examples, to support receiving the request, the request component 1030 may be configured as or otherwise support a means for receiving the request for the second network node to transmit the future signals in accordance with the second RV index order, where the second RV index order includes self-decodable RVs.

In some examples, the second RV index order includes a RV index order of zero, three, zero, and then three.

In some examples, to support receiving the request, the request component 1030 may be configured as or otherwise support a means for receiving the request for the second network node to transmit the future signals in accordance with the second RV index order via uplink control information or a medium access control-control element.

In some examples, the second network node communicates via an NTN or using URLLC communications.

In some examples, the first RV index order is based on one or more parameters at a first network node.

In some examples, the RV index order component 1025 may be configured as or otherwise support a means for transmitting a second control message indicating the first RV index order.

In some examples, the feedback component 1035 may be configured as or otherwise support a means for receiving a feedback message including an indication that a first network node failed to decode the initial transmission, where transmitting the one or more retransmissions is based on the feedback message.

Figure 11:
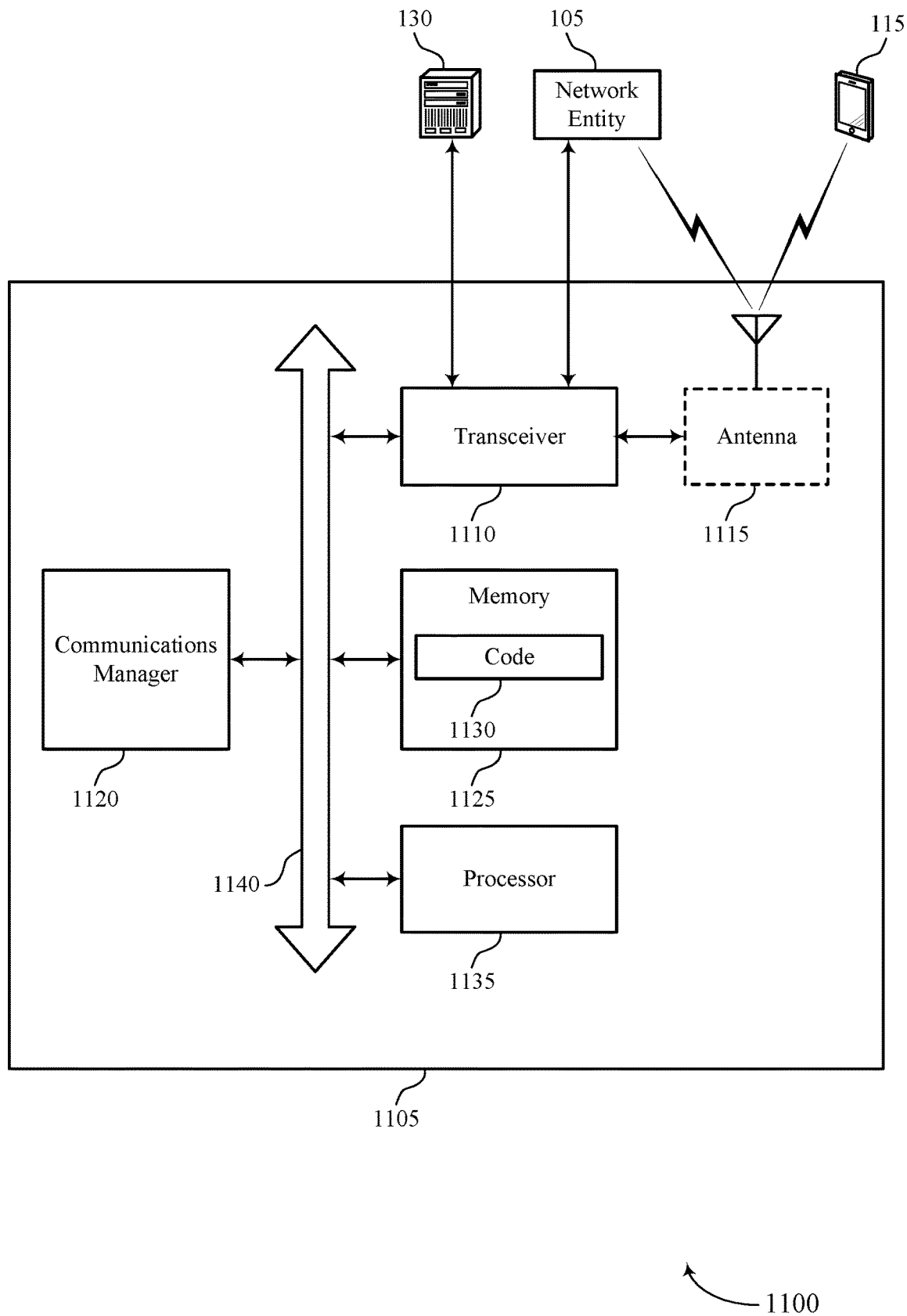
FIG. 11 shows a diagram of a system including a device that supports retransmission optimization mechanisms in accordance with one or more aspects of the present disclosure.

FIG. 11 shows a diagram of a system 1100 including a device 1105 that supports retransmission optimization mechanisms in accordance with one or more aspects of the present disclosure. The device 1105 may be an example of or include the components of a device 805, a device 905, or a second network node, such as a network entity 105 or a UE 115, as described herein. The device 1105 may communicate with one or more network nodes, such as one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting retransmission optimization mechanisms). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more network nodes, such as one or more UEs 115. In some examples, the communications manager 1120 may manage communications with other network nodes, such as network entities 105, and may include a controller or scheduler for controlling communications with network nodes, such as UEs 115, in cooperation with other network nodes, such as network entities 105. In some examples, the communications manager 1120 may support an X2 interface within an LTE/LTE-A wireless communications network technology to provide communication between network nodes.

The communications manager 1120 may support wireless communications at a second network node in accordance with examples as disclosed herein. For example, the communications manager 1120 may be configured as or otherwise support a means for transmitting one or more signals, each of the one or more signals transmitted as an initial transmission and as one or more retransmissions in accordance with a first RV index order which specifies respective RV indices for each of the initial transmission and the one or more retransmissions. The communications manager 1120 may be configured as or otherwise support a means for receiving a request that the second network node transmit future signals in accordance with a second RV index order. The communications manager 1120 may be configured as or otherwise support a means for transmitting the future signals in accordance with the second RV index order.

By including or configuring the communications manager 1120 in accordance with examples as described herein, the device 1105 may support techniques for retransmission optimization mechanisms which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of retransmission optimization mechanisms as described herein, or the processor 1135 and the memory 1125 may be otherwise configured to perform or support such operations.

Figure 12:
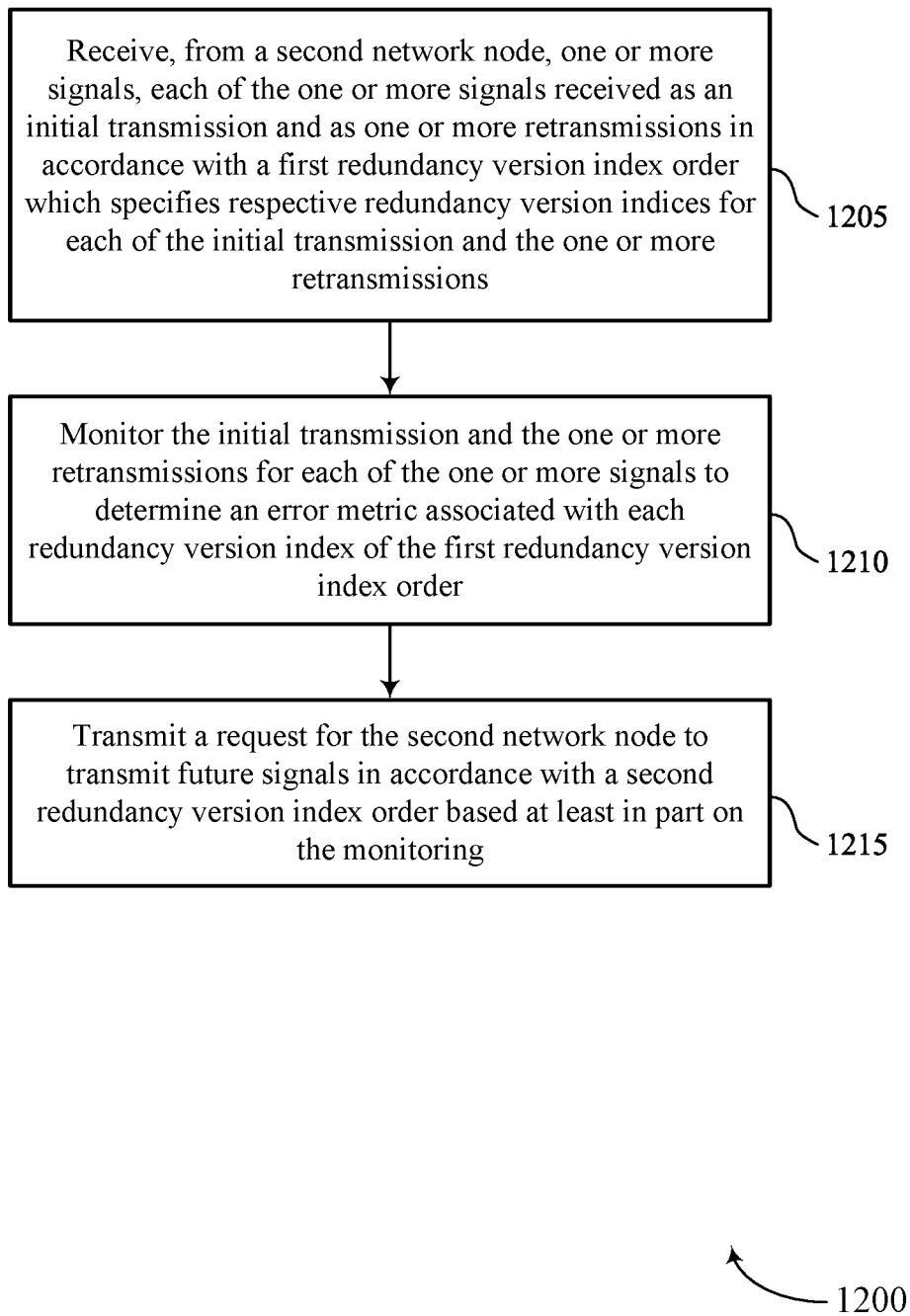
FIGS. 12 through 14 show flowcharts illustrating methods that support retransmission optimization mechanisms in accordance with one or more aspects of the present disclosure.

FIG. 12 shows a flowchart illustrating a method 1200 that supports retransmission optimization mechanisms in accordance with one or more aspects of the present disclosure. The operations of the method 1200 may be implemented by a first network node or its components as described herein. For example, the operations of the method 1200 may be performed by a first network node, such as a UE 115 or a network entity 105, as described with reference to FIGS. 1 through 7. In some examples, a first network node may execute a set of instructions to control the functional elements of the first network node to perform the described functions. Additionally, or alternatively, the first network node may perform aspects of the described functions using special-purpose hardware.

At 1205, the method may include receiving, from a second network node, one or more signals, each of the one or more signals received as an initial transmission and as one or more retransmissions in accordance with a first RV index order which specifies respective RV indices for each of the initial transmission and the one or more retransmissions. The operations of 1205 may be performed in accordance with examples as disclosed herein. In some examples, aspects of the operations of 1205 may be performed by a RV index order component 625 as described with reference to FIG. 6.

At 1210, the method may include monitoring the initial transmission and the one or more retransmissions for each of the one or more signals to determine an error metric associated with each RV index of the first RV index order. The operations of 1210 may be performed in accordance with examples as disclosed herein. In some examples, aspects of the operations of 1210 may be performed by a monitoring component 630 as described with reference to FIG. 6.

At 1215, the method may include transmitting a request for the second network node to transmit future signals in accordance with a second RV index order based on the monitoring. The operations of 1215 may be performed in accordance with examples as disclosed herein. In some examples, aspects of the operations of 1215 may be performed by a requesting component 635 as described with reference to FIG. 6.

Figure 13:
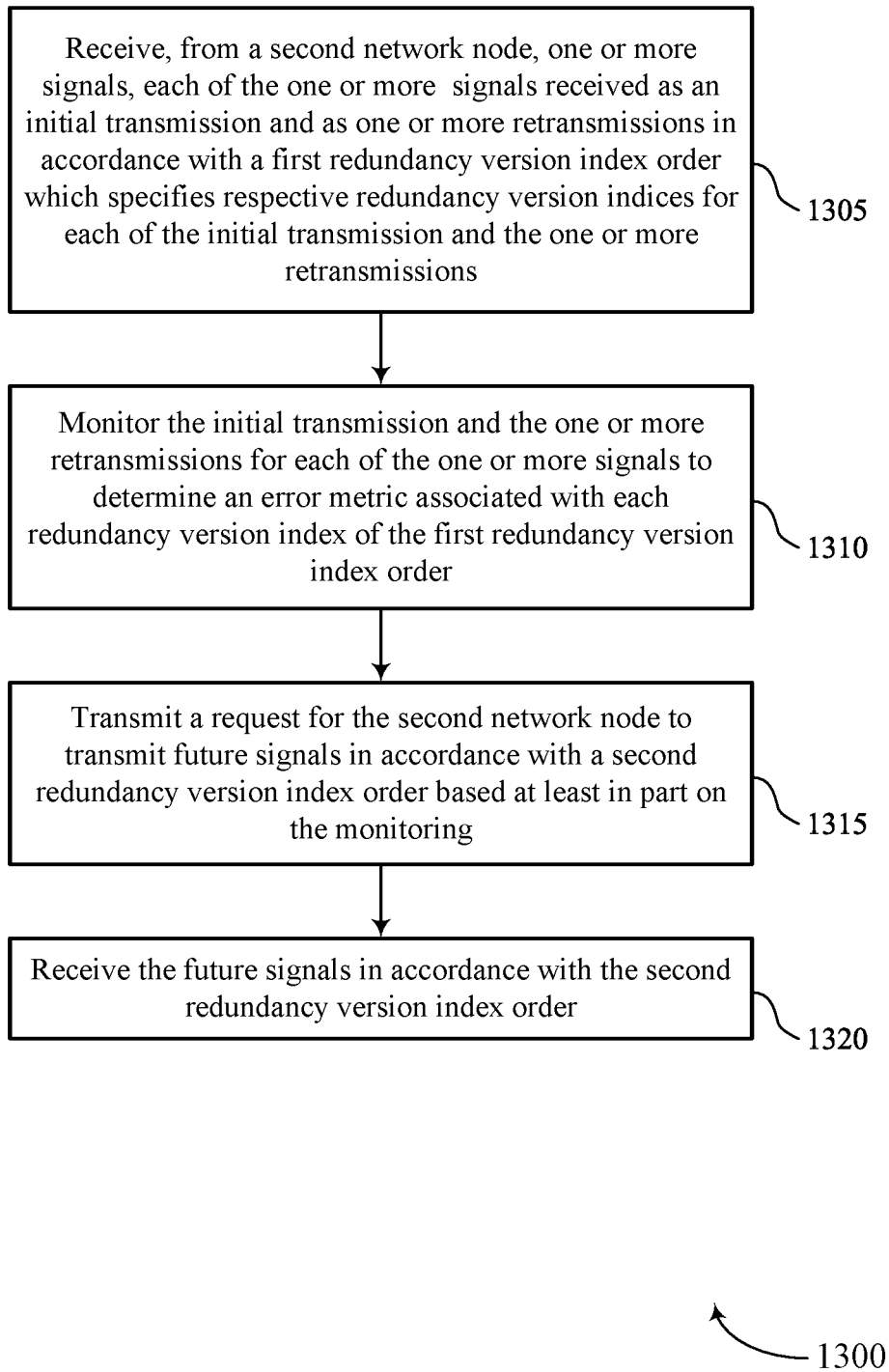

FIG. 13 shows a flowchart illustrating a method 1300 that supports retransmission optimization mechanisms in accordance with one or more aspects of the present disclosure. The operations of the method 1300 may be implemented by a first network node or its components as described herein. For example, the operations of the method 1300 may be performed by a first network node 115 as described with reference to FIGS. 1 through 7. In some examples, a first network node may execute a set of instructions to control the functional elements of the first network node to perform the described functions. Additionally, or alternatively, the first network node may perform aspects of the described functions using special-purpose hardware.

At 1305, the method may include receiving, from a second network node, one or more signals, each of the one or more signals received as an initial transmission and as one or more retransmissions in accordance with a first RV index order which specifies respective RV indices for each of the initial transmission and the one or more retransmissions. The operations of 1305 may be performed in accordance with examples as disclosed herein. In some examples, aspects of the operations of 1305 may be performed by a RV index order component 625 as described with reference to FIG. 6.

At 1310, the method may include monitoring the initial transmission and the one or more retransmissions for each of the one or more signals to determine an error metric associated with each RV index of the first RV index order. The operations of 1310 may be performed in accordance with examples as disclosed herein. In some examples, aspects of the operations of 1310 may be performed by a monitoring component 630 as described with reference to FIG. 6.

At 1315, the method may include transmitting a request for the second network node to transmit future signals in accordance with a second RV index order based on the monitoring. The operations of 1315 may be performed in accordance with examples as disclosed herein. In some examples, aspects of the operations of 1315 may be performed by a requesting component 635 as described with reference to FIG. 6.

At 1320, the method may include receiving the future signals in accordance with the second RV index order. The operations of 1320 may be performed in accordance with examples as disclosed herein. In some examples, aspects of the operations of 1320 may be performed by a RV index order component 625 as described with reference to FIG. 6.

Figure 14:
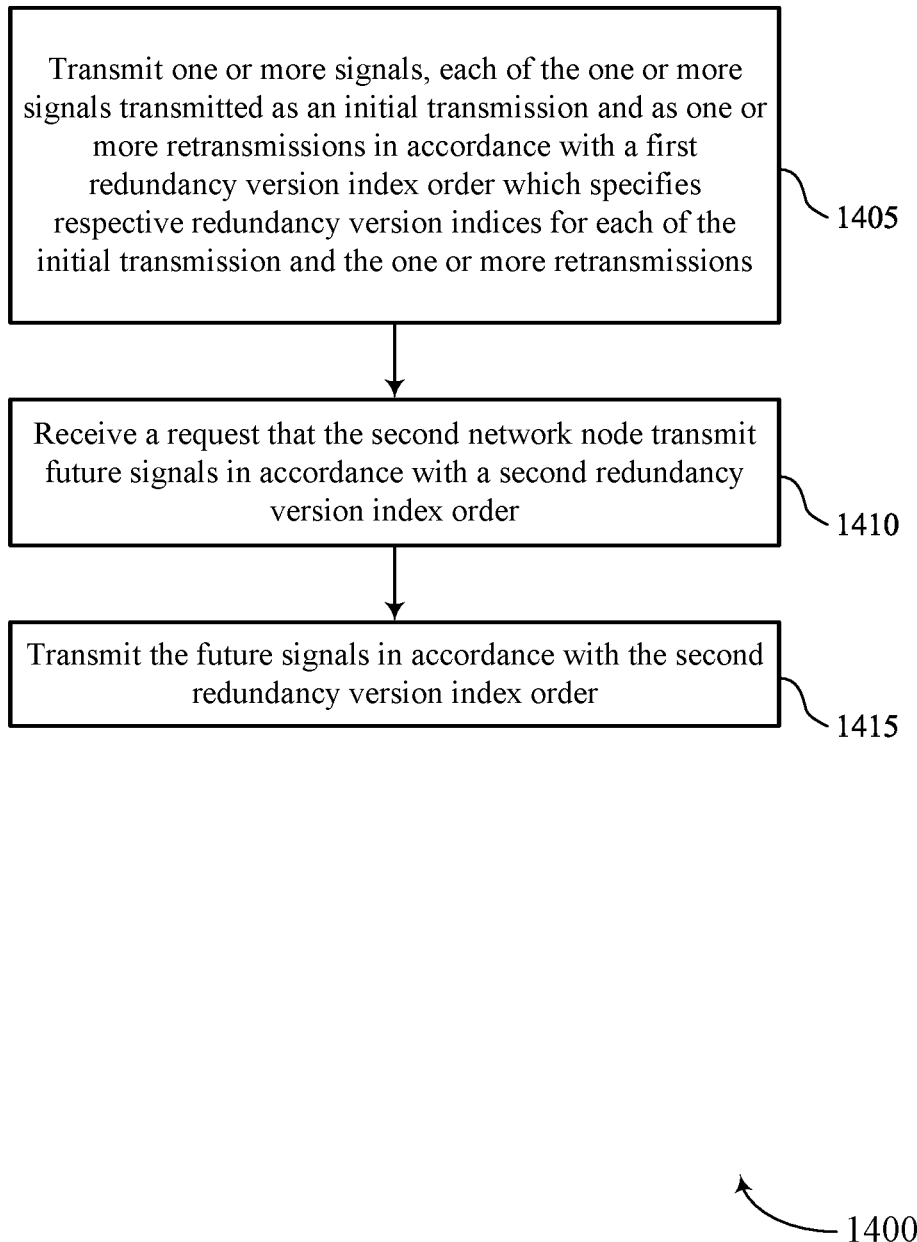

FIG. 14 shows a flowchart illustrating a method 1400 that supports retransmission optimization mechanisms in accordance with one or more aspects of the present disclosure. The operations of the method 1400 may be implemented by a second network node or its components as described herein. For example, the operations of the method 1400 may be performed by a second network node as described with reference to FIGS. 1 through 3 and 8 through 11. In some examples, a second network node may execute a set of instructions to control the functional elements of the second network node to perform the described functions. Additionally, or alternatively, the second network node may perform aspects of the described functions using special-purpose hardware.

At 1405, the method may include transmitting one or more signals, each of the one or more signals transmitted as an initial transmission and as one or more retransmissions in accordance with a first RV index order which specifies respective RV indices for each of the initial transmission and the one or more retransmissions. The operations of 1405 may be performed in accordance with examples as disclosed herein. In some examples, aspects of the operations of 1405 may be performed by a RV index order component 1025 as described with reference to FIG. 10.

At 1410, the method may include receiving a request that the second network node transmit future signals in accordance with a second RV index order. The operations of 1410 may be performed in accordance with examples as disclosed herein. In some examples, aspects of the operations of 1410 may be performed by a request component 1030 as described with reference to FIG. 10.

At 1415, the method may include transmitting the future signals in accordance with the second RV index order. The operations of 1415 may be performed in accordance with examples as disclosed herein. In some examples, aspects of the operations of 1415 may be performed by a RV index order component 1025 as described with reference to FIG. 10.

The following provides an overview of aspects of the present disclosure:

Aspect 1: A method for wireless communications at a first network node comprising: receiving, from a second network node, one or more signals, each of the one or more signals received as an initial transmission and as one or more retransmissions in accordance with a first RV index order which specifies respective RV indices for each of the initial transmission and the one or more retransmissions; monitoring the initial transmission and the one or more retransmissions for each of the one or more signals to determine an error metric associated with each RV index of the first RV index order; and transmitting a request for the second network node to transmit future signals in accordance with a second RV index order based at least in part on the monitoring.

Aspect 2: The method of aspect 1, wherein monitoring the initial transmission and the one or more retransmissions for each of the one or more signals comprises: monitoring the initial transmission and the one or more retransmissions for each of the one or more signals to determine a first error metric associated with a first RV index of the first RV index order and a second error metric associated with a second RV index of the first RV index order; and comparing the first error metric associated with the first RV index to the second error metric associated with the second RV index, wherein transmitting the request is based at least in part on the comparison.

Aspect 3: The method of aspect 2, further comprising: determining that the first error metric associated with the first RV index is less than the second error metric associated with the second RV index, wherein transmitting the request is based at least in part on the determining.

Aspect 4: The method of any of aspects 1 through 3, wherein monitoring the initial transmission and the one or more retransmissions for each of the one or more signals comprises: monitoring the initial transmission and the one or more retransmissions for each of the one or more signals to determine the error metric associated with each RV index of the first RV index order during a duration associated with a timer, wherein transmitting the request is based at least in part on expiration of the timer.

Aspect 5: The method of any of aspects 1 through 4, wherein receiving the one or more signals comprises: receiving the one or more signals, each of the one or more signals received as the initial transmission and as the one or more retransmissions in accordance with the first RV index order, wherein the first RV index order comprises self-decodable RVs, non-self-decodable RVs, or both.

Aspect 6: The method of aspect 5, wherein the first RV index order includes a RV index order of zero, two, three, and then one.

Aspect 7: The method of any of aspects 1 through 6, wherein transmitting the request comprises: transmitting the request for the second network node to transmit the future signals in accordance with the second RV index order, wherein the second RV index order comprises self-decodable RVs.

Aspect 8: The method of any of aspects 1 through 7, wherein monitoring the initial transmission and the one or more retransmissions for each of the one or more signals further comprises: measuring a BLER of the initial transmission and the one or more retransmissions, wherein the error metric associated with each RV index of the first RV index order is based at least in part on the measuring.

Aspect 9: The method of any of aspects 1 through 8, further comprising: receiving the future signals in accordance with the second RV index order.

Aspect 10: The method of aspect 9, wherein the second RV index order includes a RV index order of zero, three, zero, and then three.

Aspect 11: The method of any of aspects 1 through 10, wherein transmitting the request comprises: transmitting the request for the second network node to transmit the future signals in accordance with the second RV index order via uplink control information or a medium access control-control element.

Aspect 12: The method of any of aspects 1 through 11, wherein the first network node communicates via a non-terrestrial network or using ultra low-reliability low-latency communications.

Aspect 13: The method of any of aspects 1 through 12, wherein the first RV index order is based at least in part on one or more parameters at the first network node.

Aspect 14: The method of any of aspects 1 through 12, further comprising: receiving a second control message indicating the first RV index order.

Aspect 15: The method of any of aspects 1 through 14, further comprising: failing to decode the initial transmission; and transmitting a feedback message including an indication that the first network node failed to decode the initial transmission, wherein receiving the one or more retransmissions is based at least in part on the feedback message.

Aspect 16: A method for wireless communications at a second network node, comprising: transmitting one or more signals, each of the one or more signals transmitted as an initial transmission and as one or more retransmissions in accordance with a first RV index order which specifies respective RV indices for each of the initial transmission and the one or more retransmissions; receiving a request that the second network node transmit future signals in accordance with a second RV index order; and transmitting the future signals in accordance with the second RV index order.

Aspect 17: The method of aspect 16, wherein transmitting the one or more signals comprises: transmitting the one or more signals, each of the one or more signals transmitted as the initial transmission and as the one or more retransmissions in accordance with the first RV index order, wherein the first RV index order comprises self-decodable RVs, non-self-decodable RVs, or both.

Aspect 18: The method of aspect 17, wherein the first RV index order includes a RV index order of zero, two, three, and then one.

Aspect 19: The method of any of aspects 16 through 18, wherein receiving the request comprises: receiving the request for the second network node to transmit the future signals in accordance with the second RV index order, wherein the second RV index order comprises self-decodable RVs.

Aspect 20: The method of any of aspects 16 through 19, wherein the second RV index order includes a RV index order of zero, three, zero, and then three.

Aspect 21: The method of any of aspects 16 through 20, wherein receiving the request comprises: receiving the request for the second network node to transmit the future signals in accordance with the second RV index order via uplink control information or a medium access control-control element.

Aspect 22: The method of any of aspects 16 through 21, wherein the second network node communicates via a non-terrestrial network or using ultra low-reliability low-latency communications.

Aspect 23: The method of any of aspects 16 through 22, wherein the first RV index order is based at least in part on one or more parameters at a first network node.

Aspect 24: The method of any of aspects 16 through 22, further comprising: transmitting a second control message indicating the first RV index order.

Aspect 25: The method of any of aspects 16 through 24, further comprising: receiving a feedback message including an indication that a first network node failed to decode the initial transmission, wherein transmitting the one or more retransmissions is based at least in part on the feedback message.

Aspect 26: An apparatus comprising a processor; memory coupled with the processor; and instructions stored in the memory and executable by the processor to cause the apparatus to perform a method of any of aspects 1 through 15.

Aspect 27: An apparatus comprising at least one means for performing a method of any of aspects 1 through 15.

Aspect 28: A non-transitory computer-readable medium storing code the code comprising instructions executable by a processor to perform a method of any of aspects 1 through 15.

Aspect 29: An apparatus for wireless communications at a second network node, comprising a processor; memory coupled with the processor; and instructions stored in the memory and executable by the processor to cause the apparatus to perform a method of any of aspects 16 through 25.

Aspect 30: An apparatus for wireless communications at a second network node, comprising at least one means for performing a method of any of aspects 16 through 25.

Aspect 31: A non-transitory computer-readable medium storing code for wireless communications at a second network node, the code comprising instructions executable by a processor to perform a method of any of aspects 16 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first network node comprising:
   receiving, from a second network node, one or more signals, each of the one or more signals received as an initial transmission and as one or more retransmissions in accordance with a first redundancy version index order which specifies respective redundancy version indices for each of the initial transmission and the one or more retransmissions;
   monitoring the initial transmission and the one or more retransmissions for each of the one or more signals to determine an error metric associated with each redundancy version index of the first redundancy version index order; and
   transmitting a request for the second network node to transmit future signals in accordance with a second redundancy version index order based at least in part on the monitoring.

2. The method of claim 1, wherein monitoring the initial transmission and the one or more retransmissions for each of the one or more signals comprises:
   monitoring the initial transmission and the one or more retransmissions for each of the one or more signals to determine a first error metric associated with a first redundancy version index of the first redundancy version index order and a second error metric associated with a second redundancy version index of the first redundancy version index order; and
   comparing the first error metric associated with the first redundancy version index to the second error metric associated with the second redundancy version index, wherein transmitting the request is based at least in part on the comparison.

3. The method of claim 2, further comprising:
   determining that the first error metric associated with the first redundancy version index is less than the second error metric associated with the second redundancy version index, wherein transmitting the request is based at least in part on the determining.

4. The method of claim 1, wherein monitoring the initial transmission and the one or more retransmissions for each of the one or more signals comprises:
   monitoring the initial transmission and the one or more retransmissions for each of the one or more signals to determine the error metric associated with each redundancy version index of the first redundancy version index order during a duration associated with a timer, wherein transmitting the request is based at least in part on expiration of the timer.

5. The method of claim 1, wherein receiving the one or more signals comprises:
   receiving the one or more signals, each of the one or more signals received as the initial transmission and as the one or more retransmissions in accordance with the first redundancy version index order, wherein the first redundancy version index order comprises self-decodable redundancy versions, non-self-decodable redundancy versions, or both.

6. The method of claim 5, wherein the first redundancy version index order includes a redundancy version index order of zero, two, three, and then one.

7. The method of claim 1, wherein transmitting the request comprises:
   transmitting the request for the second network node to transmit the future signals in accordance with the second redundancy version index order, wherein the second redundancy version index order comprises self-decodable redundancy versions.

8. The method of claim 1, wherein monitoring the initial transmission and the one or more retransmissions for each of the one or more signals further comprises:
   measuring a block error rate of the initial transmission and the one or more retransmissions, wherein the error metric associated with each redundancy version index of the first redundancy version index order is based at least in part on the measuring.

9. The method of claim 1, further comprising:
   receiving the future signals in accordance with the second redundancy version index order.

10. The method of claim 9, wherein the second redundancy version index order includes a redundancy version index order of zero, three, zero, and then three.

11. The method of claim 1, wherein transmitting the request comprises:
    transmitting the request for the second network node to transmit the future signals in accordance with the second redundancy version index order via uplink control information or a medium access control-control element.

12. The method of claim 1, wherein the first network node communicates via a non-terrestrial network or using ultra low-reliability low-latency communications.

13. The method of claim 1, wherein the first redundancy version index order is based at least in part on one or more parameters at the first network node.

14. The method of claim 1, further comprising:
    receiving a second control message indicating the first redundancy version index order.

15. The method of claim 1, further comprising:
    failing to decode the initial transmission; and
    transmitting a feedback message including an indication that the first network node failed to decode the initial transmission, wherein receiving the one or more retransmissions is based at least in part on the feedback message.

16. A method for wireless communications at a second network node, comprising:
    transmitting one or more signals, each of the one or more signals transmitted as an initial transmission and as one or more retransmissions in accordance with a first redundancy version index order which specifies respective redundancy version indices for each of the initial transmission and the one or more retransmissions;
    receiving a request that the second network node transmit future signals in accordance with a second redundancy version index order; and
    transmitting the future signals in accordance with the second redundancy version index order.

17. The method of claim 16, wherein transmitting the one or more signals comprises:
    transmitting the one or more signals, each of the one or more signals transmitted as the initial transmission and as the one or more retransmissions in accordance with the first redundancy version index order, wherein the first redundancy version index order comprises self-decodable redundancy versions, non-self-decodable redundancy versions, or both.

18. The method of claim 17, wherein the first redundancy version index order includes a redundancy version index order of zero, two, three, and then one.

19. The method of claim 16, wherein receiving the request comprises:

receiving the request for the second network node to transmit the future signals in accordance with the second redundancy version index order, wherein the second redundancy version index order comprises self-decodable redundancy versions.

20. The method of claim 16, wherein the second redundancy version index order includes a redundancy version index order of zero, three, zero, and then three.

21. The method of claim 16, wherein receiving the request comprises:
receiving the request for the second network node to transmit the future signals in accordance with the second redundancy version index order via uplink control information or a medium access control-control element.

22. The method of claim 16, wherein the second network node communicates via a non-terrestrial network or using ultra low-reliability low-latency communications.

23. The method of claim 16, wherein the first redundancy version index order is based at least in part on one or more parameters at a first network node.

24. The method of claim 16, further comprising:
transmitting a second control message indicating the first redundancy version index order.

25. The method of claim 16, further comprising:
receiving a feedback message including an indication that a first network node failed to decode the initial transmission, wherein transmitting the one or more retransmissions is based at least in part on the feedback message.

26. An apparatus for wireless communications at a first network node comprising:
a processor;
memory coupled with the processor; and
instructions stored in the memory and executable by the processor to cause the apparatus to:
receive, from a second network node, one or more signals, each of the one or more signals received as an initial transmission and as one or more retransmissions in accordance with a first redundancy version index order which specifies respective redundancy version indices for each of the initial transmission and the one or more retransmissions;
monitor the initial transmission and the one or more retransmissions for each of the one or more signals to determine an error metric associated with each redundancy version index of the first redundancy version index order; and
transmit a request for the second network node to transmit future signals in accordance with a second redundancy version index order based at least in part on the monitoring.

27. The apparatus of claim 26, wherein the instructions to monitor the initial transmission and the one or more retransmissions for each of the one or more signals are executable by the processor to cause the apparatus to:
monitor the initial transmission and the one or more retransmissions for each of the one or more signals to determine a first error metric associated with a first redundancy version index of the first redundancy version index order and a second error metric associated with a second redundancy version index of the first redundancy version index order; and
compare the first error metric associated with the first redundancy version index to the second error metric associated with the second redundancy version index, wherein transmitting the request is based at least in part on the comparison.

28. The apparatus of claim 26, wherein the instructions to monitor the initial transmission and the one or more retransmissions for each of the one or more signals are executable by the processor to cause the apparatus to:
monitor the initial transmission and the one or more retransmissions for each of the one or more signals to determine the error metric associated with each redundancy version index of the first redundancy version index order during a duration associated with a timer, wherein transmitting the request is based at least in part on expiration of the timer.

29. The apparatus of claim 26, wherein the instructions are further executable by the processor to cause the apparatus to:
receive the future signals in accordance with the second redundancy version index order.

30. An apparatus for wireless communications at a second network node, comprising:
a processor;
memory coupled with the processor; and
instructions stored in the memory and executable by the processor to cause the apparatus to:
transmit one or more signals, each of the one or more signals transmitted as an initial transmission and as one or more retransmissions in accordance with a first redundancy version index order which specifies respective redundancy version indices for each of the initial transmission and the one or more retransmissions;
receive a request that the second network node transmit future signals in accordance with a second redundancy version index order; and
transmit the future signals in accordance with the second redundancy version index order.

* * * * *